(12) United States Patent
Hirano

(10) Patent No.: US 10,536,085 B2
(45) Date of Patent: Jan. 14, 2020

(54) POWER SUPPLY APPARATUS AND IMAGE FORMING APPARATUS

(71) Applicant: CANON KABUSHIKI KAISHA, Tokyo (JP)

(72) Inventor: Yuya Hirano, Odawara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/232,255

(22) Filed: Dec. 26, 2018

(65) Prior Publication Data

US 2019/0222128 A1     Jul. 18, 2019

(30) Foreign Application Priority Data

Jan. 12, 2018     (JP) ................. 2018-003785

(51) Int. Cl.
*H02M 3/335*     (2006.01)
*H02M 1/08*     (2006.01)
(Continued)

(52) U.S. Cl.
CPC .... *H02M 3/33553* (2013.01); *G03G 15/5004* (2013.01); *G03G 15/80* (2013.01); *H02M 1/08* (2013.01); *G03G 2215/00025* (2013.01); *G03G 2215/00978* (2013.01); *H02M 1/32* (2013.01); *H02M 1/36* (2013.01); *H02M 3/33523* (2013.01); *H02M 7/1557* (2013.01); *H02M 2001/0009* (2013.01); *H02M 2001/0019* (2013.01)

(58) Field of Classification Search
CPC ...... H02M 3/33553; H02M 1/08; H02M 1/32; H02M 7/1557; H02M 1/36; H02M 3/33523; H02M 2001/0019; H02M 2001/0009; G03G 15/80; G03G 15/5004; G03G 2215/00978; G03G 2215/00025
See application file for complete search history.

(56) References Cited

U.S. PATENT DOCUMENTS 5,867,720 A     2/1999 Hirano
6,041,382 A     3/2000 Hirano
(Continued)

FOREIGN PATENT DOCUMENTS

JP     2012-29363     2/2012

*Primary Examiner* — Kyle J Moody
(74) *Attorney, Agent, or Firm* — Venable LLP

(57) ABSTRACT

The power supply apparatus includes a switching element connected to a primary winding of a transformer to which an input voltage is applied; a feedback unit configured to output a first feedback voltage according to an output voltage, the output voltage induced in a secondary winding of the transformer and output to a load; a current detection unit for detecting a current flowing to the switching element and output a second feedback voltage according to the current detected; a limiting unit for limiting the first feedback voltage so that the current flowing to the switching element is below a predetermined current value; an output unit for outputting a driving signal for the switching element based on the first feedback voltage limited by the limiting unit and on the second feedback voltage; and a control unit for controlling the switching element according to the driving signal output from the output unit.

13 Claims, 18 Drawing Sheets

(51) Int. Cl.
*G03G 15/00* (2006.01)
*H02M 1/00* (2006.01)
*H02M 1/32* (2007.01)
*H02M 1/36* (2007.01)
*H02M 7/155* (2006.01)

(56) References Cited

U.S. PATENT DOCUMENTS

2008/0298095 A1* 12/2008 Chuang ............. H02M 3/33523
    363/21.12
2011/0182090 A1*  7/2011 Huang .............. H02M 3/33507
    363/26
2015/0349651 A1* 12/2015 Morota ............. H02M 3/33523
    363/21.15
2018/0146109 A1*  5/2018 Kobayashi ............... H02M 1/44
2018/0351464 A1* 12/2018 Finkel ............... H02M 3/33507

* cited by examiner

POWER SUPPLY APPARATUS AND IMAGE FORMING APPARATUS

BACKGROUND OF THE INVENTION

Field of the Invention

The present invention relates to a power supply apparatus and an image forming apparatus that have power-saving mode.

Description of the Related Art

With the recent miniaturization trend in electronic equipment, there is an increasing need to miniaturize switching power supplies used in electronic equipment. In conventional power supply apparatuses, an electrolytic capacitor with a large capacitance and a high breakdown voltage is generally used for smoothing an AC voltage input from a commercial power supply into a DC voltage. Unfortunately, electrolytic capacitors have a problem of difficulty in miniaturization and profile reduction. In this regard, Japanese Patent Application Laid-Open No. 2012-29363 proposes a technique of miniaturizing a power supply apparatus by eliminating a smoothing capacitor.

However, for such power supply apparatuses without a primary-side smoothing capacitor as in Japanese Patent Application Laid-Open No. 2012-29363, and even for power supply apparatuses with a small-capacitance capacitor, there has been a desire to realize high power-supply efficiency even under light load by minimizing loss caused by changes in input voltage, along with a desire for miniaturization.

SUMMARY OF THE INVENTION

An aspect of the present invention is a power supply apparatus that realizes high power-supply efficiency even under light load and that can also accommodate large-current output.

Another aspect of the present invention is a power supply apparatus including a rectification unit configured to rectify an AC voltage from an AC power supply to generate an input voltage, a transformer having a primary winding and a secondary winding, a first switching element connected to the primary winding of the transformer to which the input voltage is applied, a feedback unit configured to output a first feedback voltage according to an output voltage, the output voltage being induced in the secondary winding of the transformer and output to a load, a current detection unit configured to detect a current flowing to the first switching element and output a second feedback voltage according to the current detected, a limiting unit configured to limit the first feedback voltage so that the current flowing to the first switching element is below a predetermined current value, an output unit configured to output a driving signal for the first switching element based on the first feedback voltage limited by the limiting unit and on the second feedback voltage, and a control unit configured to control an operation of the first switching element according to the driving signal output from the output unit.

A further aspect of the present invention is an image forming apparatus including an image forming unit configured to form an image on a recording material, and a power supply apparatus configured to generate power for forming the image, wherein the power supply apparatus includes a rectification unit configured to rectify an AC voltage from an AC power supply to generate an input voltage, a transformer having a primary winding and a secondary winding, a first switching element connected to the primary winding of the transformer to which the input voltage is applied, a feedback unit configured to output a first feedback voltage according to an output voltage, the output voltage being induced in the secondary winding of the transformer and output to a load, a current detection unit configured to detect a current flowing to the first switching element and output a second feedback voltage according to the current detected, a limiting unit configured to limit the first feedback voltage so that the current flowing to the first switching element is below a predetermined current value, an output unit configured to output a driving signal for the first switching element based on the first feedback voltage limited by the limiting unit and on the second feedback voltage; and a control unit configured to control an operation of the first switching element according to the driving signal output from the output unit.

Further features of the present invention will become apparent from the following description of exemplary embodiments with reference to the attached drawings.

DESCRIPTION OF THE EMBODIMENTS

[Configuration of Image Forming Apparatus]

Figure 1:
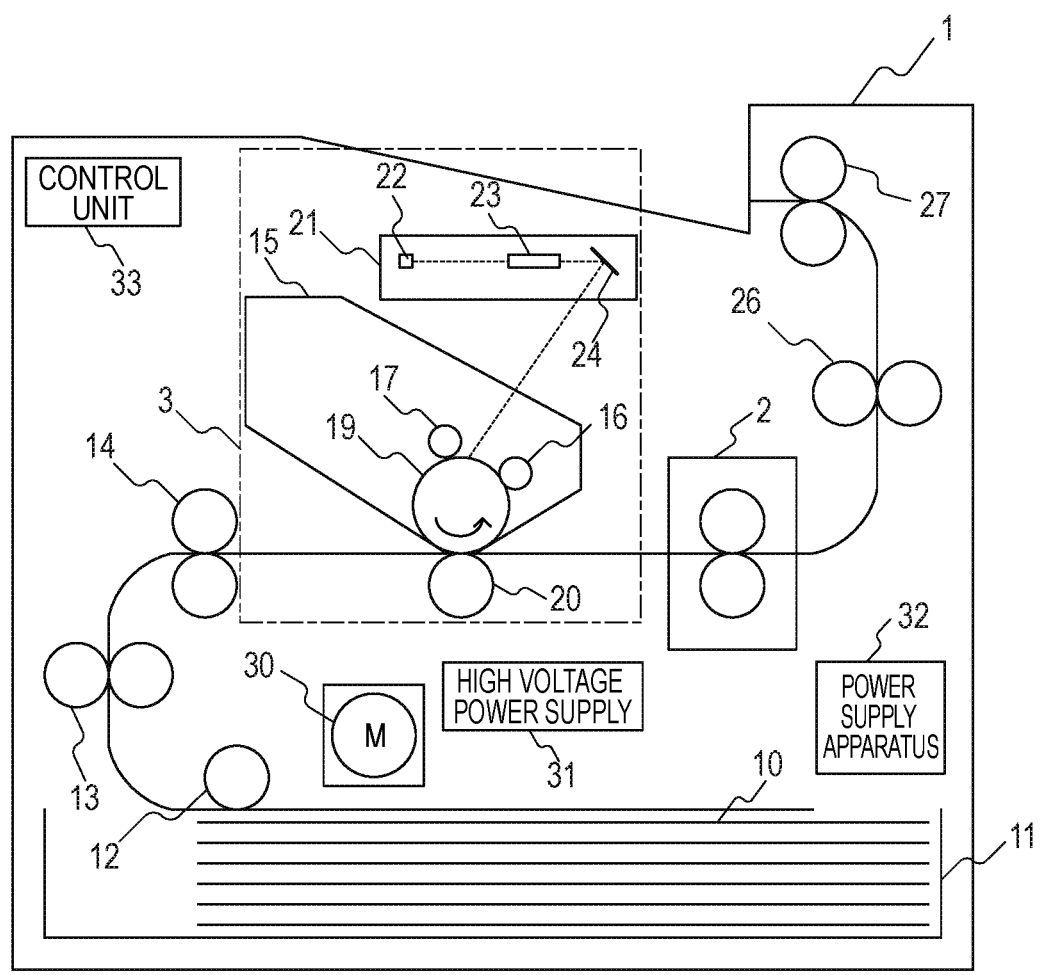
FIG. 1 is a schematic cross-sectional view illustrating a configuration of an image forming apparatus in first and second embodiments.

FIG. 1 is a schematic cross-sectional view illustrating a configuration of an image forming apparatus 1 to which a power supply apparatus 32 (to be described later) is applied. In FIG. 1, an image forming unit 3 (the portion framed by a chain line) that performs image forming includes a process cartridge 15, a scanner unit 21, and a transfer roller 20. The process cartridge 15 is integrally configured with a charge roller 16, a developing device 17, and a photosensitive drum 19, by which an unfixed toner image is formed on each recording material 10 (recording paper) through a series of known electrophotography processes. The scanner unit 21 has a laser device 22, a lens 23, and a mirror 24. Laser light emitted from the laser device 22 is uniformized by the lens 23, reflected by the mirror 24, and scans the surface of the photosensitive drum 19. Upon start of image forming operations, laser light modulated according to image information is emitted from the scanner unit 21 in the image forming unit 3 and scans the surface of the photosensitive drum 19 charged by the charge roller 16 at a predetermined potential, resulting in an electrostatic latent image formed on the photosensitive drum 19. Toner supplied from the developing device 17 adheres to the formed electrostatic latent image to form a toner image on the photosensitive drum 19.

Meanwhile, each recording material 10 stacked in a paper feed cassette 11 serving as a paper feed unit is fed by a pickup roller 12 one by one and conveyed toward registration rollers 14 via rollers 13. The recording material 10 is then conveyed from the registration rollers 14 in synchronization with the arrival of the toner image on the photosensitive drum 19 at a transfer nip unit formed of the photosensitive drum 19 and the transfer roller 20. As the recording material 10 passes through the transfer nip unit, the toner image on the photosensitive drum 19 is transferred onto the recording material 10. The recording material 10 is then conveyed to an image heating apparatus 2, where the toner image on the recording material 10 is heated and pressed to be fixed onto the recording material 10. The recording material 10 with the fixed toner image is ejected onto a tray on the image forming apparatus 1 via rollers 26 and 27. A motor 30 (shown as M) in FIG. 1 rotationally drives the photosensitive drum 19 and the image heating apparatus 2. A high voltage power supply 31 that generates high voltages applies high voltages to the charge roller 16, the developing device 17, and the transfer roller 20. The power supply apparatus 32 supplies power to devices such as the motor 30, the high voltage power supply 31, and the scanner unit 21. A control unit 33 serving as a controller controls driving timing and operations of each device in order to perform the above-described image forming. The control unit 33 also has a timer for measuring time.

[Configuration of Power Supply Apparatus]

Figure 2:
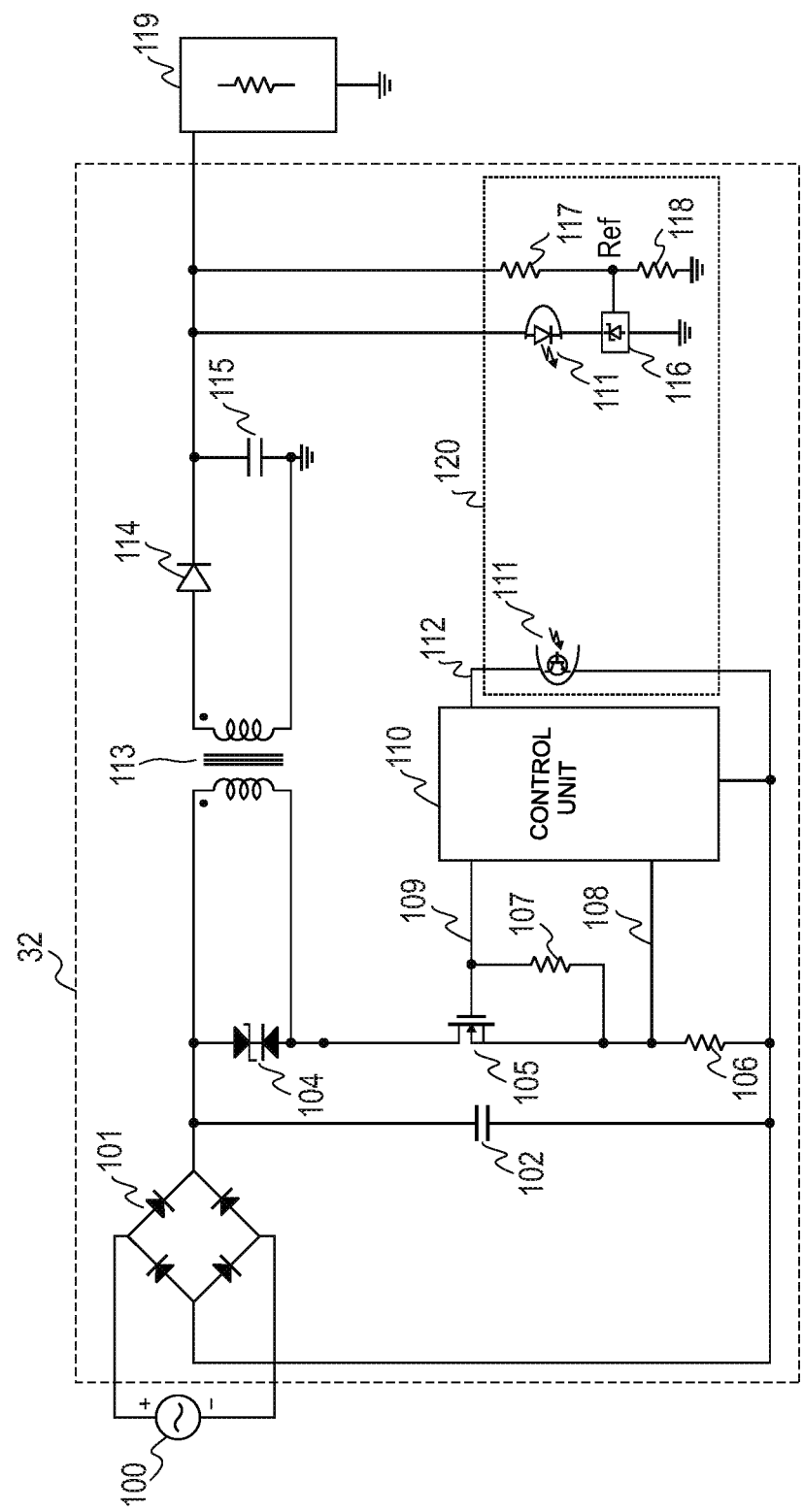
FIG. 2 is a schematic diagram illustrating a circuit configuration of a power supply apparatus in the first embodiment.

FIG. 2 is a schematic circuit diagram illustrating a configuration of the power supply apparatus 32 shown in FIG. 1. The power supply apparatus 32 shown as surrounded by a dashed line generates a DC voltage from an AC voltage input from a commercial AC power supply 100 serving as an AC power supply, and supplies the DC voltage to a load 119. In the power supply apparatus 32, a rectifier 101 serving as a rectification unit generates a pulsating voltage from the AC voltage input from the commercial AC power supply 100. A capacitor 102 is a small-capacitance ceramic capacitor for absorbing surges of the pulsating voltage. Because of the small capacitance, the capacitor 102 cannot smooth the pulsating voltage unlike a large-capacitance electrolytic capacitor. The generated pulsating voltage is supplied, via a primary winding of a transformer 113, to the secondary side of the transformer 113 through switching operation of a field-effect transistor (hereinafter referred to as an FET) 105 serving as a switching element. The switching operation of the FET 105 is controlled by a control unit 110. A resistor 107 is placed for stabilizing the voltage between the gate and source terminals of the FET 105. A detection resistor 106 serving as a current detection unit is a current detection resistor for detecting a drain current of the FET 105. A voltage occurring between the terminals of the detection resistor 106 is input as a feedback signal 108 (a second feedback voltage) to the control unit 110.

The secondary side of the transformer 113 is provided with a diode 114 and a smoothing capacitor 115, as a rectification and smoothing unit for generating an induced voltage in a secondary winding. The generated DC voltage is supplied to the load 119 as an output voltage of the power supply apparatus 32. The secondary side of the transformer 113 is provided with a feedback unit 120 that outputs the state of the output voltage as a feedback signal 112 (a first feedback voltage) to the control unit 110 for keeping the output voltage constant. The feedback unit 120 serving as a feedback unit includes a shunt regulator 116, voltage dividing resistors 117 and 118, and a photocoupler 111. The voltage division ratio between the voltage dividing resistors 117 and 118 is set such that an input voltage at a Ref terminal of the shunt regulator 116 equals a reference voltage when the output voltage is a desired voltage. Thus, when the output voltage to the load 119 falls below the desired voltage, the shunt regulator 116 conducts, so that the photodiode side of the photocoupler 111 conducts to emit light and the phototransistor side is turned on. While the phototransistor of the photocoupler 111 is in an on state, the voltage of the feedback signal 112 decreases. In contrast, when the output voltage to the load 119 exceeds the desired voltage, the shunt regulator 116 goes out of conduction, so that the photodiode side of the photocoupler 111 goes out of conduction and the phototransistor side is turned off. While the phototransistor of the photocoupler 111 is in an off state, the voltage of the feedback signal 112 increases. In this manner, the state of the output voltage of the transformer 113 is input to the control unit 110 as the feedback signal 112. Based on the states of the feedback signals 108 and 112, the control unit 110 controls the switching timing and duty of the FET 105 using a drive signal 109 output to the gate terminal of the FET 105. The control unit 110 thus keeps the output voltage to the load 119 at the desired constant voltage value. A surge killer 104 protects the FET 105 by suppressing the voltage, surging due to the switching operation, between the drain and source terminals of the FET 105. The load 119 represents the load of, e.g., the control unit 33 to be described later.

[Configuration of Control Unit]

Figure 3:
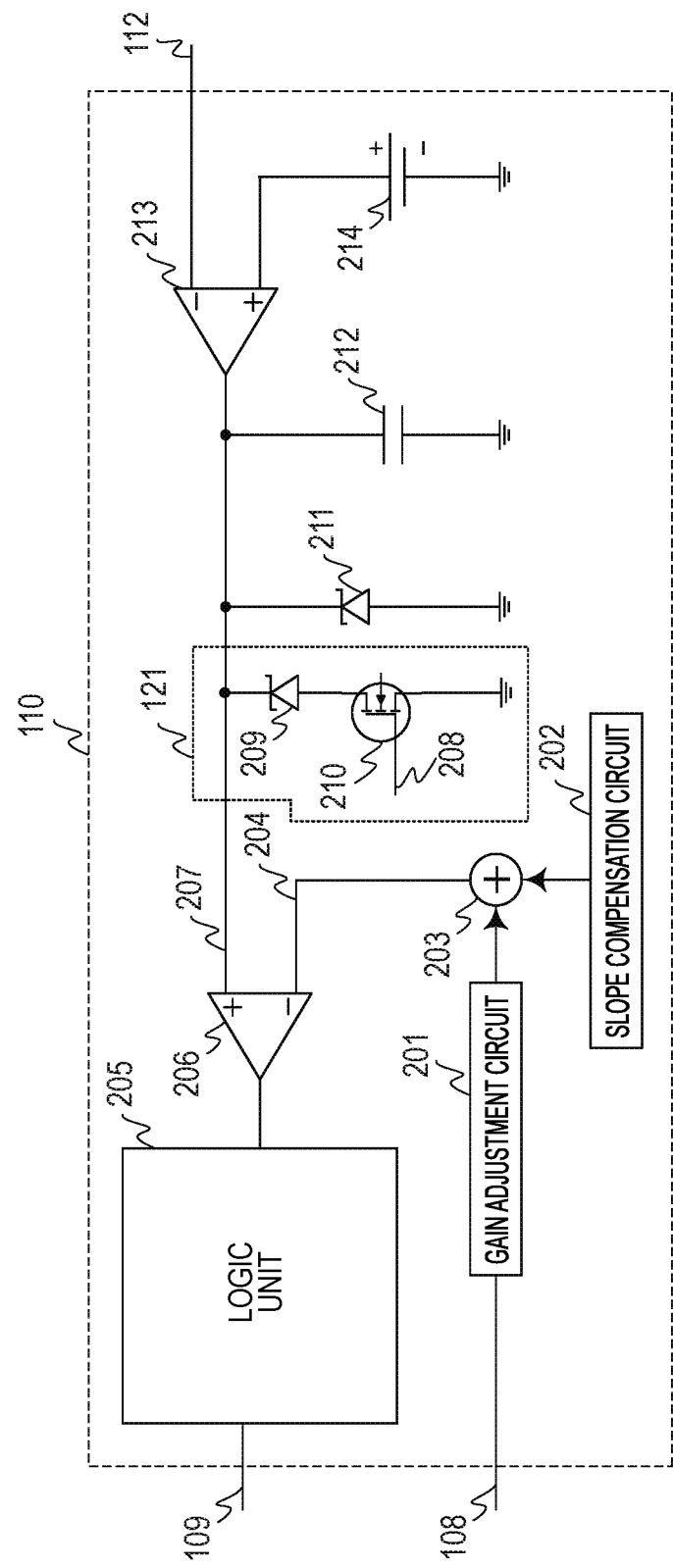
FIG. 3 is a circuit diagram describing a configuration of a control unit in the first embodiment.

The method of controlling the switching duty of the FET 105 in this embodiment will now be described. FIG. 3 is a schematic circuit diagram illustrating a configuration of the control unit 110. The control unit 110 includes a logic unit 205 (a control unit) that outputs the drive signal 109 for the FET 105, and an output unit that includes circuits other than the logic unit 205 and outputs, to the logic unit 205, a driving signal for driving the FET 105. This embodiment employs current-controlled fixed-frequency PWM control, in which the control unit 110 controls the switching duty of the FET 105 based on the two feedback signals 108 and 112. In FIG. 3, an Operational Transconductance Amplifier (OTA) 213 receives a reference voltage from a reference power supply 214 at the non-inverting terminal (+), and receives the feedback signal 112 at the inverting terminal (−). The feedback signal 112 is amplified by the OTA 213 and the capacitor 212 to generate a voltage-feedback voltage 207. The feedback signal 108 is input to a gain adjustment circuit 201 and multiplied by a gain. An adder 203 adds up the gain-multiplied feedback signal 108 and a slope compensation signal output from a slope compensation circuit 202 to generate a current-feedback voltage 204. Here, the slope compensation signal is a signal generated by the slope compensation circuit 202 for preventing subharmonic oscillations.

A comparator 206 receives the voltage-feedback voltage 207 at the non-inverting terminal (+), and receives the current-feedback voltage 204 at the inverting terminal (−). The comparator 206 outputs, to the logic unit 205, the result of comparison between the voltage-feedback voltage 207 and the current-feedback voltage 204 as an output signal (a driving signal). The logic unit 205 includes components such as an SR flip-flop (not illustrated) and an oscillator (not illustrated). The logic unit 205 determines the rising-edge timing of the drive signal 109 for the FET 105 based on the frequency of a pulse signal output from the oscillator, and determines the falling-edge timing based on the state of the output signal output from the comparator 206. By determining the rising-edge timing and the falling-edge timing of the drive signal 109 in this manner, the control unit 110 controls the switching duty of the FET 105. Description will be given later for a Zener diode 211; a Zener diode 209 and an FET 210 that form a current limiting circuit 121 serving as a limiting unit; and a current limit switching signal 208.

[Switching Control of FET]

Figure 4:
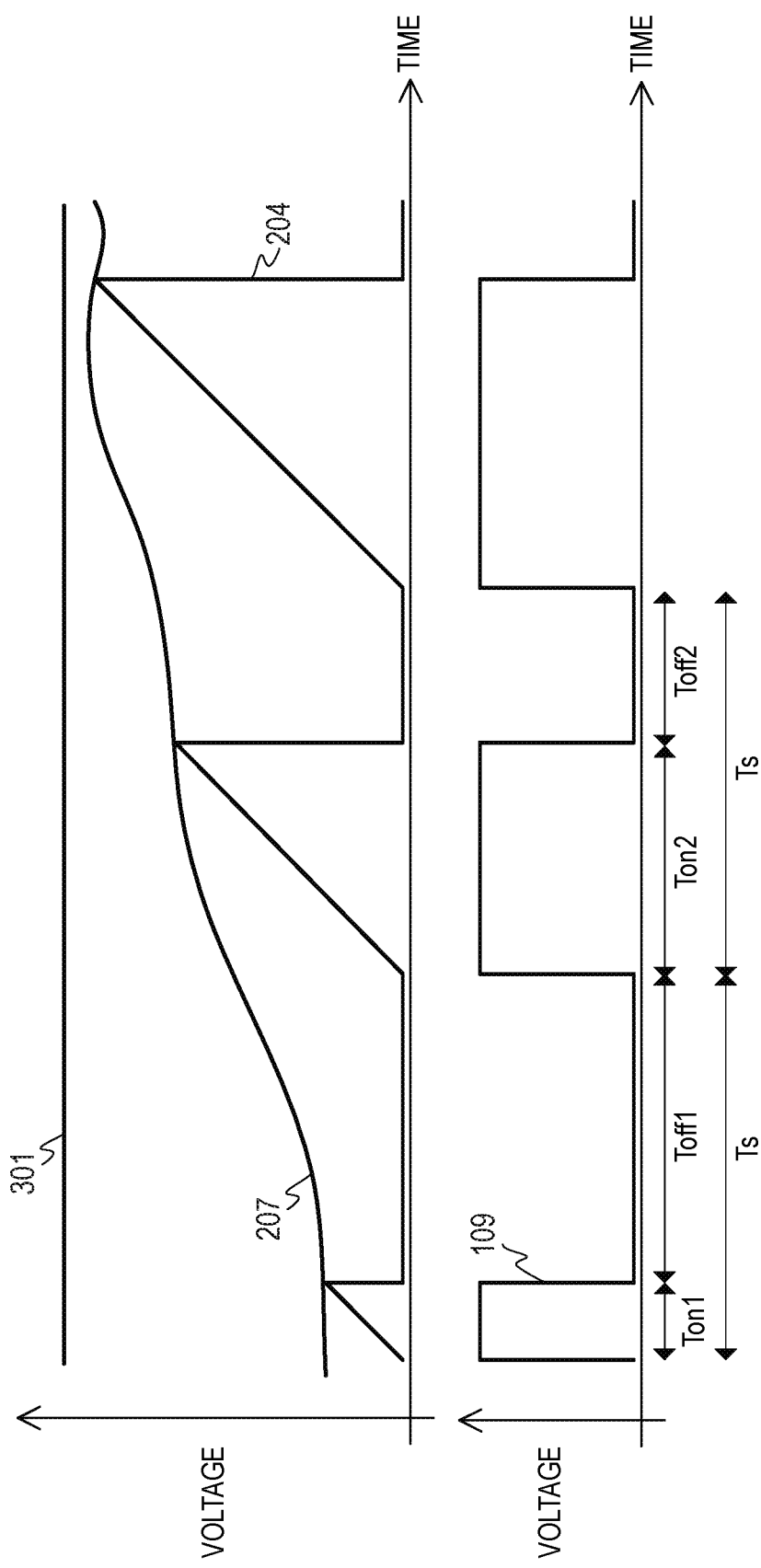
FIG. 4 is a diagram describing control operation of the power supply apparatus in the first embodiment.

FIG. 4 is a diagram describing the relationship of the voltage-feedback voltage 207 and the current-feedback voltage 204 (the input voltages to the comparator 206) with the drive signal 109 for the FET 105. In FIG. 4, the upper figure illustrates voltage waveforms of the voltage-feedback voltage 207 and the current-feedback voltage 204 input to the comparator 206, where the horizontal axis represents time and the vertical axis represents voltage. A voltage 301 indicates a Zener voltage of the Zener diode 211 in FIG. 3. The lower figure in FIG. 4 illustrates a signal waveform of the drive signal 109 output from the control unit 110 to the gate terminal of the FET 105, where the horizontal axis represents time and the vertical axis represents voltage.

In response to a pulse signal output from the oscillator of the logic unit 205 in the control unit 110, the drive signal 109 rises (into an on state) to turn on the FET 105. This causes the current-feedback voltage 204 generated based on the feedback signal 108 input to the control unit 110 to begin increasing. Once the current-feedback voltage 204 exceeds the voltage-feedback voltage 207 generated based on the feedback signal 112, the output of the comparator 206 transitions to low level, so that the drive signal 109 falls (into an off state) to turn off the FET 105. After the lapse of a period Ts of the pulse signal output from the oscillator of the logic unit 205 since the rise (into an on state) of the drive signal 109, the drive signal 109 rises again to start the next switching period of the FET 105. The period Ts, in other words, the frequency of the drive signal 109 is constant.

If the output voltage falls below the set voltage value, the voltage-feedback voltage 207 increases. Now define Ton1 as the on-time (the period of the on-state) of the FET 105 in the preceding period. The increase of the voltage-feedback voltage 207 extends the time before the current-feedback voltage 204 exceeds the voltage-feedback voltage 207 in the next period. As a result, the on-time Ton2 of the FET 105 in the next period is longer than the on-time Ton1 (Ton1<Ton2). In FIG. 4, the off-time Toff1 denotes the period in which the FET 105 is off after the on-time Ton1 of the FET 105, and the off-time Toff2 denotes the period in which the FET 105 is off after the on-time Ton2 of the FET 105. The extension of the on-time of the FET 105 can increase the output voltage because more energy can be provided to the load in one switching. If the output voltage exceeds the set voltage value, the on-time of the FET 105 is shortened to reduce the output voltage. In this manner, the control unit 110 controls the output voltage to be at the set voltage value by controlling the on-time of the FET 105. The Zener diode 211 shown in FIG. 3, serving as a second voltage limiting element, is provided for preventing the voltage-feedback voltage 207 from becoming excessively high to destroy surrounding elements. The voltage-feedback voltage 207 is thus prevented from reaching or exceeding the Zener voltage 301 of the Zener diode 211. The value of the Zener voltage 301 is selected to be below rated voltages of the surrounding elements.

[Switching Current under Light Load]

Figure 5:
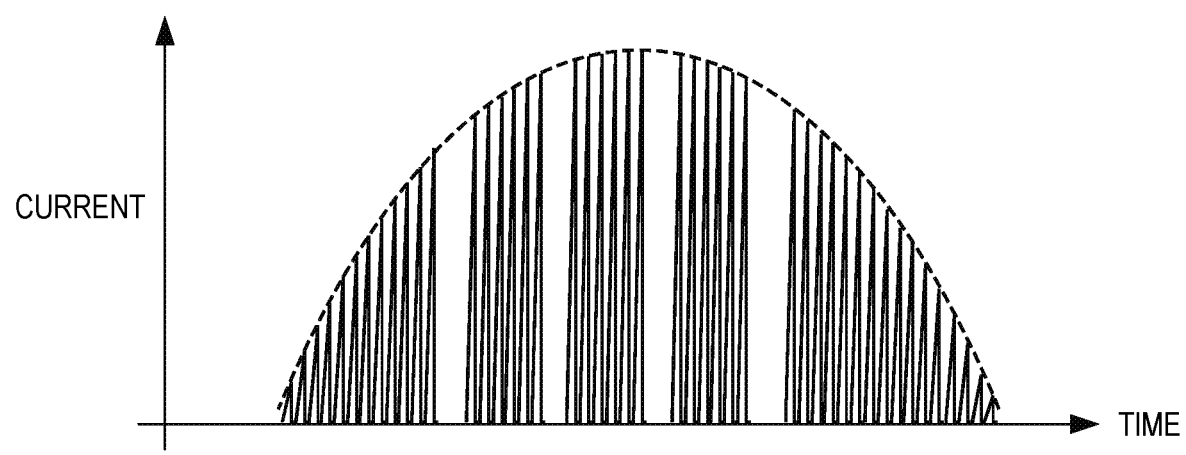
FIG. 5 is a diagram describing a switching current, under light load, of the power supply apparatus in the first embodiment.

FIG. 5 is a graph illustrating a switching current waveform in a half period of the pulsating voltage resulting from rectifying the AC voltage from the commercial AC power supply 100 by the rectifier 101, and especially illustrating a switching current waveform under light load. In FIG. 5, the horizontal axis represents time and the vertical axis represents current value, and a waveform shown by a dashed line is a waveform of the pulsating voltage. Under light load, the power supply apparatus 32 operates in burst mode according to the control unit 110, in which the switching period of the FET 105 is longer. Since the pulsating voltage output from the rectifier 101 is applied to the FET 105, the maximum value of a switching current flowing to the FET 105 changes as the AC voltage of the commercial AC power supply 100 changes. Consequently, around the peak value of the pulsating voltage, the maximum value of the switching current also increases, resulting in an increased loss in the FET 105.

[Control Operation under Current Limitation]

Figure 6:
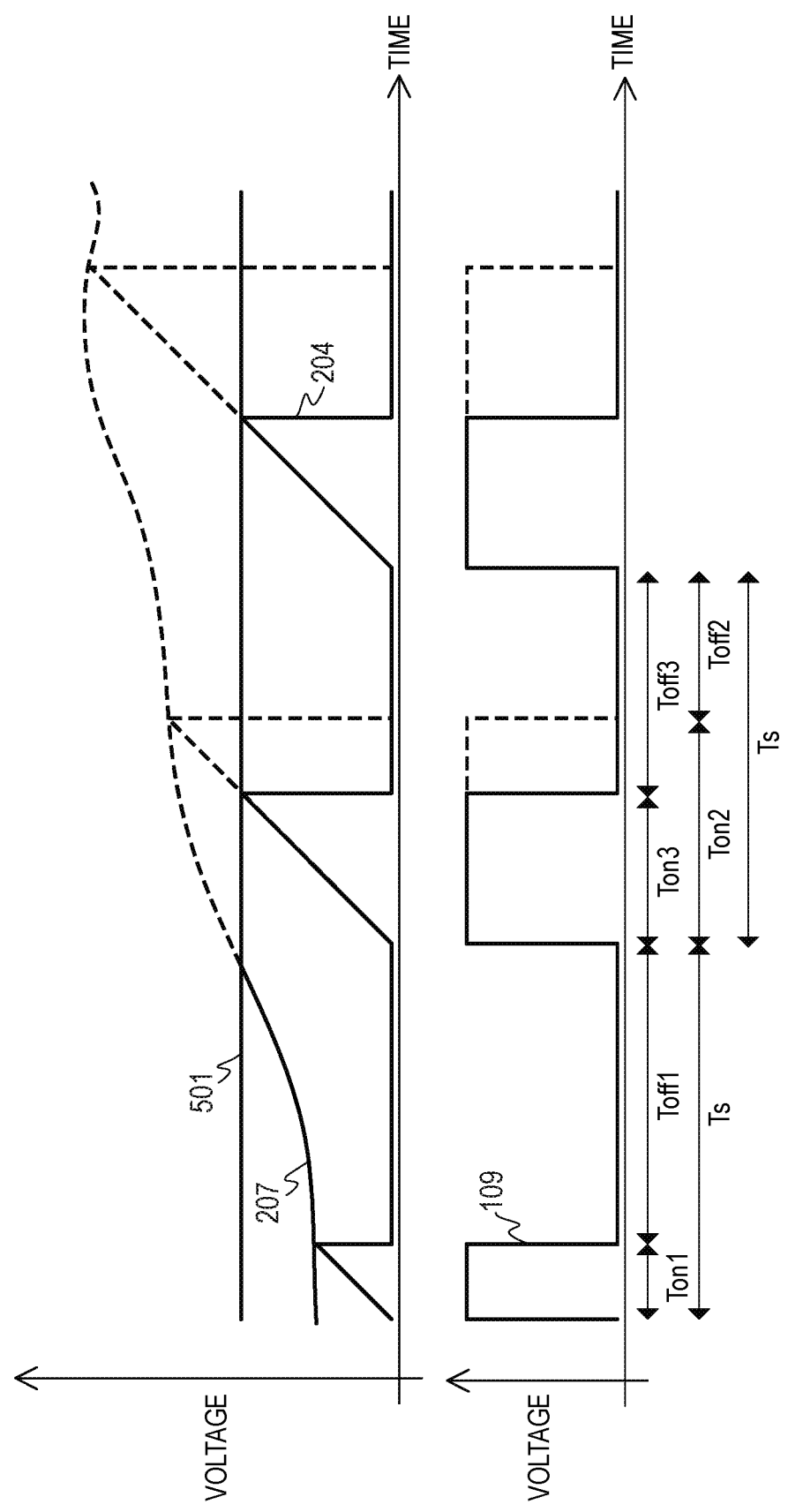
FIG. 6 is a diagram describing control operation, under current limitation, of the power supply apparatus in the first embodiment.

FIG. 6 is a diagram describing the relationship of the current-feedback voltage 204 and the voltage-feedback voltage 207 (the two input voltages to the comparator 206) with the drive signal 109 controlling the switching operation of the FET 105, in the case where the switching current flowing through the FET 105 is limited. In FIG. 6, the horizontal axis represents time and the vertical axis represents voltage. In FIG. 6, dotted-line waveforms of the voltage-feedback voltage 207, the current-feedback voltage 204, and the drive signal 109 for the FET 105 are waveforms as in FIG. 2 without current limitation to be described below. In FIG. 3, to limit the maximum value of the switching current of the FET 105, the current limit switching signal 208 to be input to the gate terminal of the FET 210 (a switching element) is set at high level, thereby turning on the FET 210. The current limit switching signal 208 in this embodiment is supplied as, for example, an instruction signal output from the external control unit 33 (to be described later). Then, the voltage-feedback voltage 207 to be input to the comparator 206 is corrected by the Zener diode 209, serving as a first voltage control element, so that the voltage is kept below the Zener voltage 501 of the Zener diode 209. The Zener voltage 501 is assumed to be below the Zener voltage 301 of the Zener diode 211 (Zener voltage 501<Zener voltage 301).

Here, if the switching current of the FET 105 is not limited, Ton2 (a dashed line in FIG. 6) is the on-time of the FET 105 controlled by the drive signal 109 output at a time when the comparator 206 receives the current-feedback voltage 204 and the voltage-feedback voltage 207. In contrast, if the switching current of the FET 105 is limited by the current limit switching signal 208, the on-time Ton3 of the FET 105 controlled by the drive signal 109 is shorter than the on-time Ton2 due to the Zener diode 209 (Ton3<Ton2). Consequently, the off-time Toff3 of the FET 105 is longer than the off-time Toff2 due to the Zener diode 209 (Toff3>Toff2). That is, when the current-feedback voltage 204 exceeds the voltage-feedback voltage 207 having the maximum voltage suppressed at the same voltage as the Zener voltage 501 of the Zener diode 209, the drive signal 109 transitions to low level to turn off the FET 105. Thus, the maximum value of the switching current of the FET 105 can be limited. It is to be noted that the Zener voltage 501 of the Zener diode 209 is determined to achieve a desired maximum value of the switching current based on the relationship among the detection resistor 106 for the switching current of the FET 105, the gain adjustment circuit 201, and the slope compensation value. How to determine the maximum value of the switching current will be described later.

[Switching Current under Current Limitation]

Figure 7:
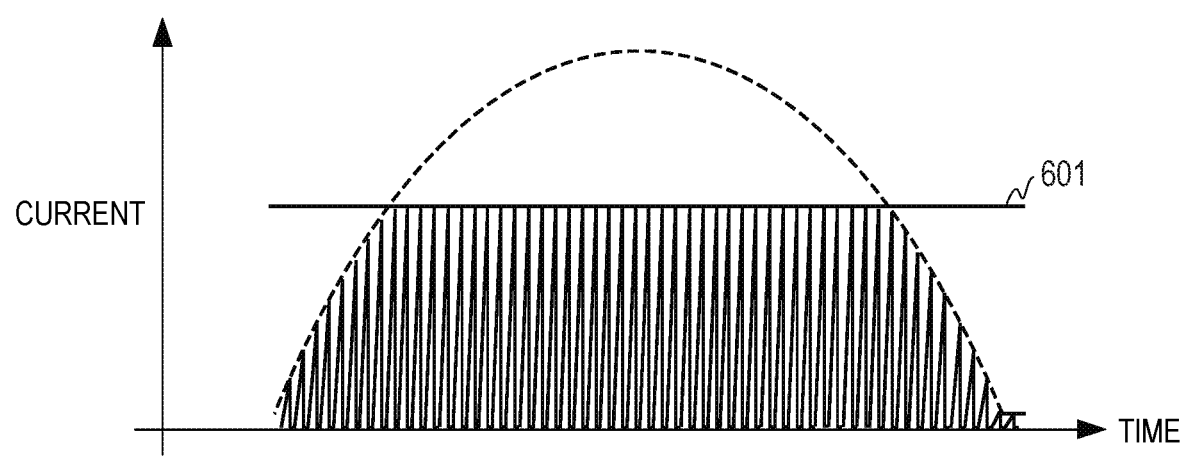
FIG. 7 is a diagram describing a switching current, under current limitation, of the power supply apparatus in the first embodiment.

FIG. 7 illustrates a switching current waveform in a half period, under light load, of the pulsating voltage resulting from rectifying the AC voltage from the commercial AC power supply 100 by the rectifier 101, in the case where the switching current limitation in this embodiment is performed. In FIG. 7, the horizontal axis represents time and the vertical axis represents the current value of the switching current. In FIG. 7, the switching current value of the FET 105 is kept below the maximum current value 601 of the switching current of the FET 105 set by the Zener voltage 501 of the Zener diode 209. The maximum current value 601 of the switching current is determined such that the input power to the transformer 113 does not fall below the output power required by the load 119. The input power to the transformer 113 is the product of the values of the AC voltage and the current input from the commercial AC power supply 100. The current value of the commercial AC power supply 100 approximately equals the value of the switching current of the FET 105. Therefore, the output power is the input power multiplied by the efficiency of the power supply apparatus 32. When the image forming apparatus 1 shown in FIG. 1 is operating in burst mode such as in the sleep state, the input power to the transformer 113 is unchanged even if the maximum value of the switching current is lowered by the current limitation on the FET 105. That is, since the burst periods in which the FET 105 is in an off state and no switching current flows are shortened and the periods in which the FET 105 is in an on state and the switching current flows are extended, the input current to the transformer 113 is unchanged irrespective of whether the current is limited or not. In the switching current waveform in FIG. 7, the maximum value of the switching current is smaller than the maximum value in the switching current waveform in FIG. 5. On the other hand, the burst periods (in which no switching current flows) shown in FIG. 5 are absent, and the periods in which the switching current flows are extended. Therefore, the output power required by the load 119 can be supplied as in the case without switching current limitation.

[Control Sequence in Image Forming Apparatus]

Figure 8:
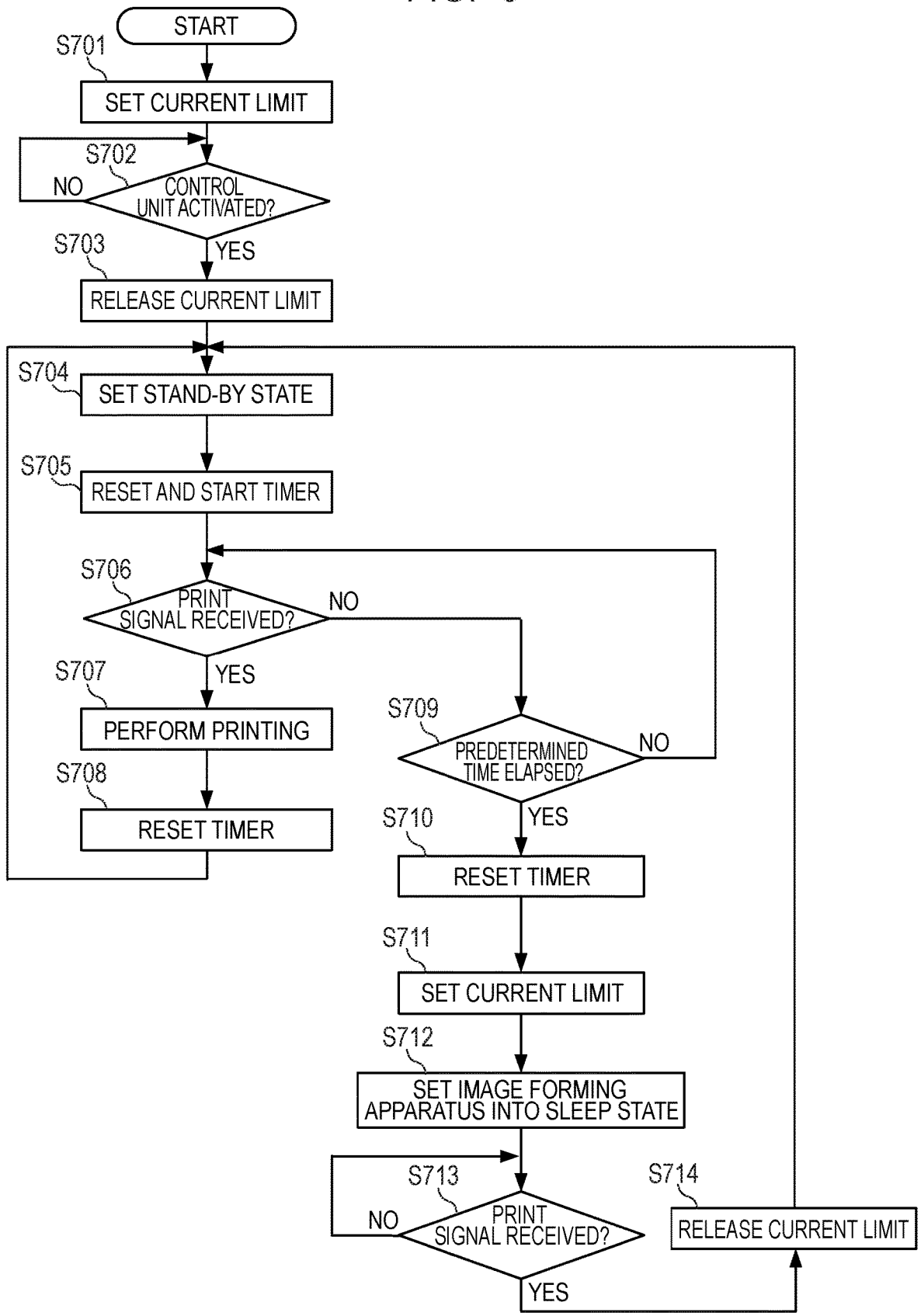
FIG. 8 is a flowchart illustrating a control sequence of the image forming apparatus in the first embodiment.

FIG. 8 is a flowchart illustrating a sequence of control steps (S701 to S714) of the power supply apparatus 32 in the image forming apparatus 1. The process in FIG. 8 is started upon power-on of the image forming apparatus 1 and carried out by the control unit 33 of the image forming apparatus 1.

Upon power-on of the image forming apparatus 1, the rectifier 101 generates a pulsating voltage from an AC voltage input from the commercial AC power supply 100, and the FET 105 performs switching. The switching current of the FET 105 transfers energy to the smoothing capacitor 115 on the secondary side via the transformer 113 to charge the smoothing capacitor 115. Since the smoothing capacitor 115 is uncharged before power-on, an excessive charge current (an inrush current) would flow immediately after power-on for charging the smoothing capacitor 115 on the secondary side. At S701, the current limit is set on the switching current of the FET 105 as shown in FIG. 7. That is, the high-level current limit switching signal 208 is input to the control unit 110 of the power supply apparatus 32 until a predetermined time elapses after the power-on.

At S702, it is determined whether or not the control unit 33 is activated by power supplied from the power supply apparatus 32. If it is determined that the control unit 33 is activated, the process proceeds to S703; otherwise, the process returns to S702. At S703, based on the activation of the control unit 33, the control unit 33 determines that the smoothing capacitor 115 on the secondary side is sufficiently charged. The control unit 33 sets the current limit switching signal 208 (to be input to the control unit 110 of the power supply apparatus 32) at low level to release the current limit on the switching current of the FET 105. At S704, the control unit 33 sets the image forming apparatus 1 into the stand-by state, which is a heavy-load state capable of printing operation. At S705, the control unit 33 resets and starts the timer for measuring time set for the stand-by state. At S706, the control unit 33 determines whether or not an external print signal is received that requests image forming onto the recording material 10. If it is determined that the print signal is received, the control unit 33 advances the process to S707; otherwise, the control unit 33 advances the process to S709.

At S707, the control unit 33 performs operations of image forming onto the recording material 10 according to the received print signal ("perform printing" in FIG. 8). Upon completion of the image forming onto the recording material 10, the control unit 33 advances the process to S708. At S708, the control unit 33 resets and stops the timer and returns the process to S704. At S709, the control unit 33 refers to the timer to determine whether or not a predetermined time (for example, five minutes) has elapsed with no print signal received after the stand-by state had been entered. If it is determined that the predetermined time has not elapsed, the control unit 33 returns the process to S706; otherwise, the control unit 33 advances the process to S710. At S710, the control unit 33 resets the timer. At S711, in order to improve the efficiency of the power supply apparatus 32 under light load, the control unit 33 sets a limit on the switching current of the FET 105 by setting the current limit switching signal 208 (to be input to the control unit 110 of the power supply apparatus 32) at high level. At S712, the control unit 33 sets the image forming apparatus 1 into the sleep state (sleep mode) so that the image forming apparatus 1 enters a power-saving state, which is a light-load state. At S713, the control unit 33 determines whether or not an external print signal is received. If it is determined that a print signal is received, the control unit 33 advances the process to S714; otherwise, the control unit 33 returns the process to S713. At S714, in order to be able to accommodate large-current output in printing operations, the control unit 33 releases the current limit on the switching current of the FET 105 by setting the current limit switching signal 208 (to be input to the control unit 110 of the power supply apparatus 32) at low level. The control unit 33 then returns the process to S704.

As described above, in this embodiment, the control unit 110 includes the Zener diode 209 that limits the switching current flowing to the FET 105, and the FET 210 that controls the conduction state of the Zener diode 209 to switch the current limit. When the image forming apparatus 1 is under light load such as in sleep mode, the limit amount of the switching current in the FET 105 can be increased to reduce loss in the FET 105, thereby improving power supply efficiency under light load. If the output voltage is controlled to be constant, the output power required by the load 119 is determined by the load current. Therefore, required input power is also determined by the load current. For example, suppose that the image forming apparatus 1 is switchable among multiple sleep modes (for example, a sleep mode with an output power of 0.5 W, a sleep mode with 1 W, and a sleep mode with 3 W) depending on the output power supplied by the image forming apparatus 1 to the load 119. In this case, switching the current limit according to the load current in each sleep mode can minimize power supply loss in that sleep mode.

Further, for avoiding destruction of the FET 105 by an inrush current, the current limit for inrush current prevention can be set to limit the amount of current upon power-on, thereby preventing an excessive inrush current from flowing into the FET 105. A circuit may also be provided in which multiple FETs each serially connected with the respective Zener diode having different Zener voltage are placed in parallel with the Zener diode 209 serially connected with the FET 210 shown in FIG. 3, and a current limit switching signal is input to each FET. This allows setting multiple current limits. In this embodiment, the above-described optimal control in normal operation and inrush current prevention control upon power-on can both be realized to provide an inexpensive power supply apparatus. When a large-current output power is being supplied to the load 119, limiting the switching current of the FET 105 would cause a shortage of energy supplied to the load, resulting in a reduced output voltage. Therefore, during large-current output, the FET 210 is turned off to eliminate the limit on the switching current of the FET 105. Thus, both the output current in sleep mode and the output current during large-current output can be accommodated.

As described above, according to this embodiment, high power-supply efficiency can be realized even under light load, and large-current output can also be accommodated.

In the first embodiment, the maximum current value of the switching current flowing to the FET 105 is a predetermined fixed current value. In a second embodiment, an example will be described in which the maximum current value of the switching current flowing to the FET 105 is controlled according to the input voltage from the commercial AC power supply 100.

[Configuration of Power Supply Apparatus]

Figure 9:
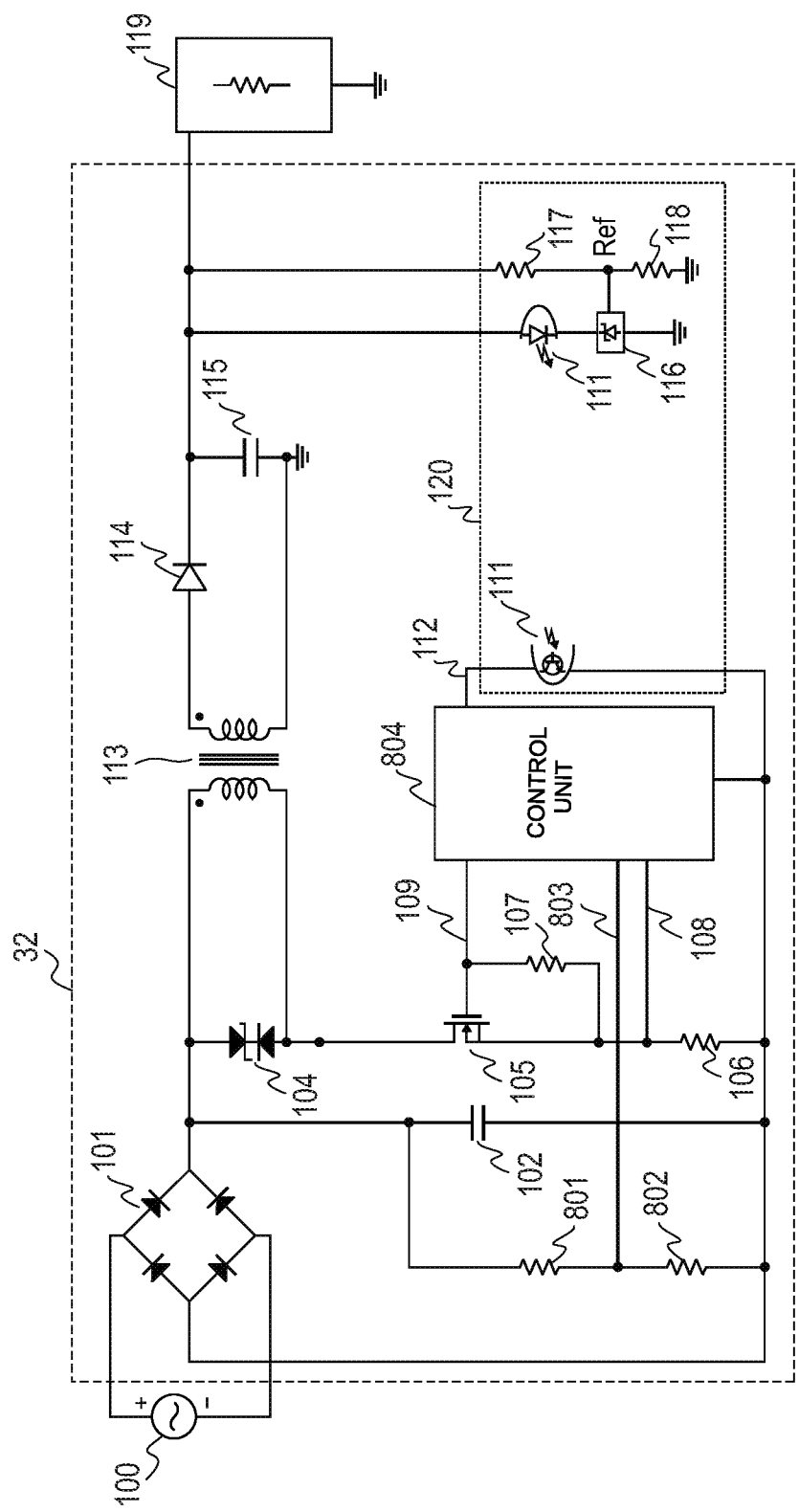
FIG. 9 is a schematic diagram illustrating a circuit configuration of a power supply apparatus in the second embodiment.

FIG. 9 is a schematic diagram illustrating a circuit configuration of the power supply apparatus 32 in this embodiment. Compared with the configuration of the power supply apparatus 32 shown in FIG. 2 of the first embodiment, the configuration in FIG. 9 differs in that resistors 801 and 802 dividing the input voltage are added, and the control unit 110 is replaced with a control unit 804. Details of the control unit 804 will be described later. The voltage dividing resistors 801 and 802, serving as a voltage detection unit, divide the output voltage output from the rectifier 101 and inputs the divided voltage as an input voltage detection signal 803 (a third feedback voltage) to the control unit 804. Other circuit components are similar to the circuit components in the first embodiment; like circuit components are given like numerals and will not be described.

[Configuration of Control Unit]

Figure 10:
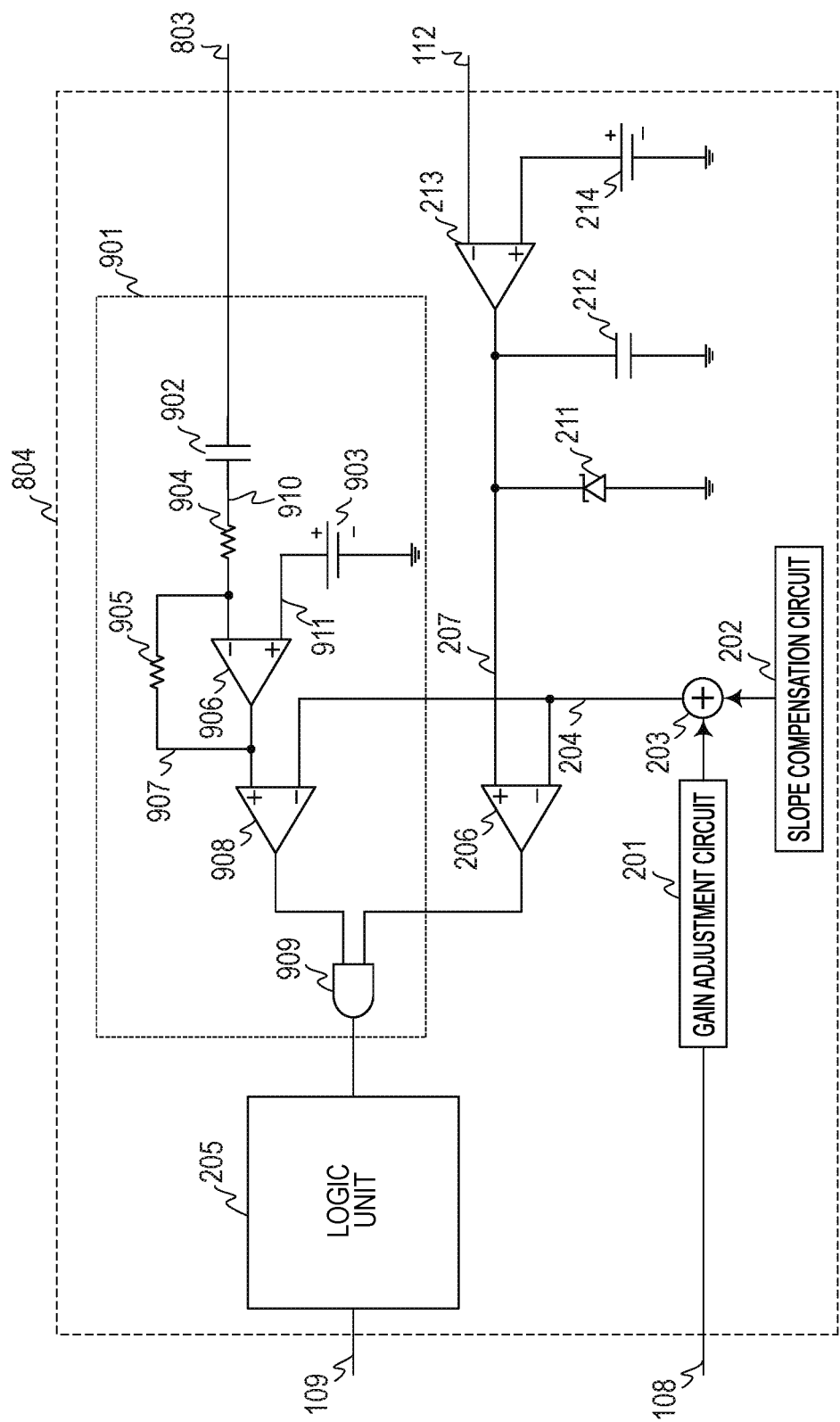
FIG. 10 is a diagram describing a configuration of a control unit in the second embodiment.

FIG. 10 is a schematic circuit diagram illustrating a configuration of the control unit 804. Compared with FIG. 3 illustrating the configuration of the control unit 110 in the first embodiment, in FIG. 10, the Zener diode 209 and the FET 210 that control the limitation on the switching current of the FET 105 are removed, whereas a current limiting unit 901 is added. The current limiting unit 901 receives the input voltage detection signal 803, the current-feedback voltage 204, and the output of the comparator 206. Other circuit components are similar to the circuit components in FIG. 2 of the first embodiment and will not be described.

The current limiting unit 901 includes an operational amplifier 906, a comparator 908, an AND circuit 909, a capacitor 902, resistors 904 and 905, and a reference power supply 903. The capacitor 902 is a coupling capacitor, and the operational amplifier 906, the resistors 904 and 905, and the reference power supply 903 form an inverting amplifier that amplifies and inverts the polarity of an input and outputs the result. With a virtual ground, the voltage at the inverting terminal (−) of the operational amplifier 906 equals the voltage at the non-inverting terminal (+) of the operational amplifier 906, i.e., a reference voltage 911 of the reference power supply 903. The output terminal of the operational amplifier 906 and the coupling capacitor 902 are interconnected via the inverting terminal (−) of the operational amplifier 906 and the resistors 904 and 905. Therefore, if no input voltage detection signal 803 is input, the output terminal voltage 907 of the operational amplifier 906 and a coupling voltage 910 of the coupling capacitor 902 also approximately equal the reference voltage 911 of the reference power supply 903.

The comparator 908 receives the output terminal voltage 907 at the non-inverting input terminal (+), and the current-feedback voltage 204 at the inverting input terminal (−). The comparator 206 receives the voltage-feedback voltage 207 at the non-inverting input terminal (+), and the current-feedback voltage 204 at the inverting input terminal (−). The outputs of the comparator 908 and the comparator 206 are input to the AND circuit 909. If the outputs of the comparators 908 and 206 are both at high level, the AND circuit 909 outputs a high-level signal to the logic unit 205. If either one or both of the outputs of the comparators 908 and 206 are at low level, the AND circuit 909 outputs a low-level signal to the logic unit 205.

Figure 11A:
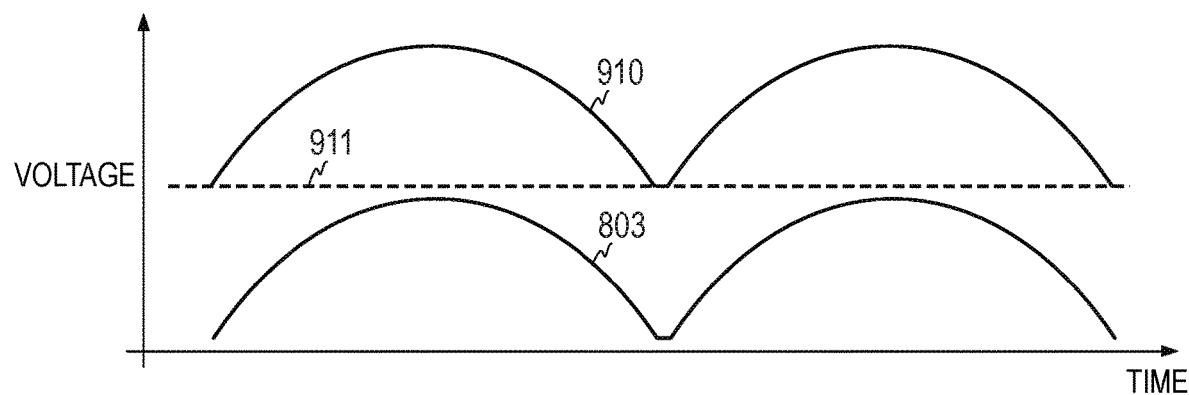
FIGS. 11A and 11B are diagrams describing control operation of the power supply apparatus in the second embodiment.
Figure 11B:
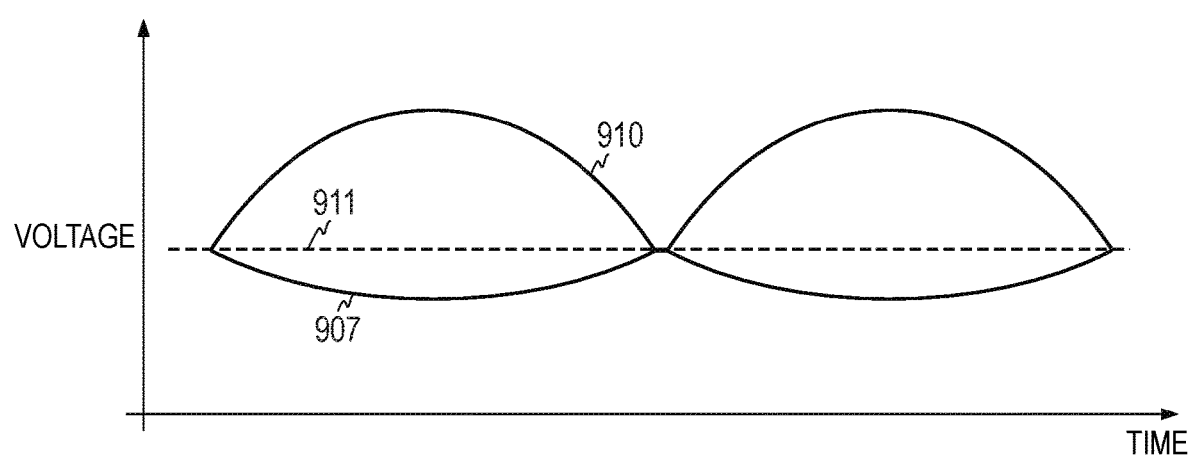

FIGS. 11A and 11B are diagrams describing a voltage waveform of the output terminal voltage 907 obtained when the input voltage detection signal 803 is input. FIG. 11A is a diagram describing the relationship among the input voltage detection signal 803, the reference voltage 911 of the reference power supply 903, and the coupling voltage 910 of the coupling capacitor 902. The horizontal axis represents time and the vertical axis represents voltage. When the input voltage detection signal 803 is input to the current limiting unit 901, the coupling capacitor 902 produces the waveform of the coupling voltage 910 as illustrated in FIG. 11A, i.e., a voltage waveform such that an AC component of the input voltage detection signal 803 is added to the reference voltage 911 of the reference power supply 903.

FIG. 11B is a diagram describing the relationship between the coupling voltage 910 of the coupling capacitor 902 and the output terminal voltage 907, where the horizontal axis represents time and the vertical axis represents voltage. As described above, the operational amplifier 906, the resistors 904 and 905, and the reference power supply 903 form the inverting amplifier. Therefore, the output terminal voltage 907 (an inverted voltage) is output as a waveform such that a signal resulting from inverting the coupling voltage 910 by the inverting amplifier with the resistance ratio between the resistors 904 and 905 is added to the reference voltage 911. Since the output terminal voltage 907 has a voltage waveform resulting from inverting and amplifying the input voltage detection signal 803, the output terminal voltage 907 is lower when the voltage of the input voltage detection signal 803 is higher, and higher when the voltage of the input voltage detection signal 803 is lower.

[Control Operation under Current Limitation]

Figure 12:
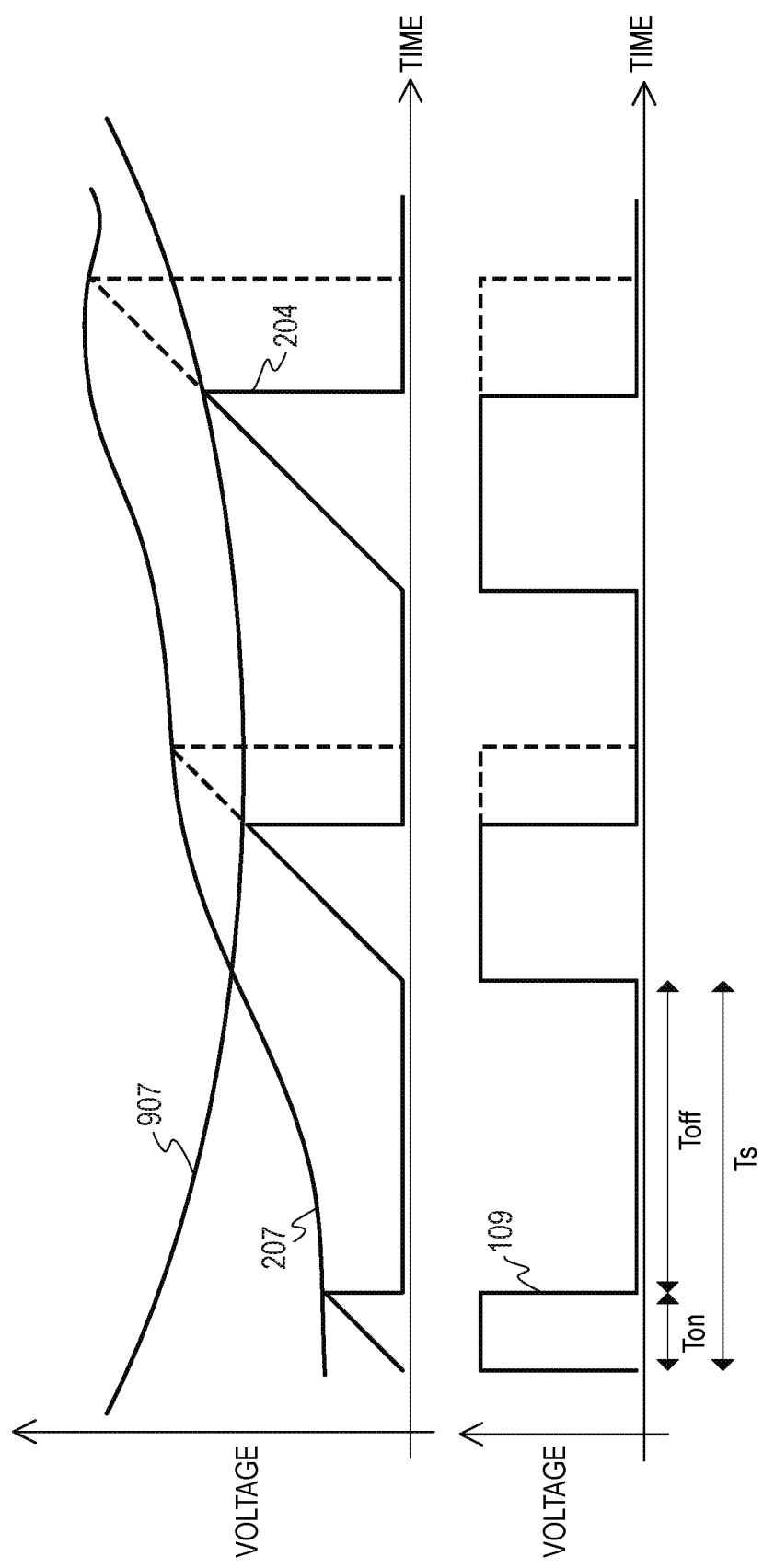
FIG. 12 is a diagram describing control operation, under current limitation, of the power supply apparatus in the second embodiment.

FIG. 12 is a diagram describing the relationship of the current-feedback voltage 204, the voltage-feedback voltage 207, and the output terminal voltage 907, with the drive signal 109 controlling the switching operation of the FET 105, in the case where the switching current flowing through the FET 105 is limited. In FIG. 12, the horizontal axis represents time and the vertical axis represents voltage. In FIG. 12, waveforms of the voltage-feedback voltage 207, the current-feedback voltage 204, and the drive signal 109 for the FET 105 shown by dashed lines are waveforms without current limitation based on the output terminal voltage 907. In FIG. 12, Ton denotes the on-time of the drive signal 109 (which is also the on-time of the FET 105), Toff denotes the off-time of the drive signal 109 (which is also the off-time of the FET 105), and Ts denotes the period of the drive signal 109.

As illustrated in FIG. 12, when the current is not limited, that is, when the current-feedback voltage 204 and the voltage-feedback voltage 207 are lower than the output terminal voltage 907, the duty is controlled by the drive signal 109 according to the output signal of the comparator 206 as in the first embodiment. What is different from the first embodiment is that the output terminal voltage 907 varying inversely with the input voltage detection signal 803 is used as the current limit value in this embodiment. As described above, in the current limiting unit 901 shown in FIG. 10, the output voltages of the comparators 206 and 908 are input to the AND circuit 909. When the output signal of the comparator 908 transitions to low level, the AND circuit 909 outputs a low-level signal. As a result, the drive signal 109 output to the FET 105 is forcibly set at low level to turn off the FET 105, thereby limiting the current. Thus, by using the output terminal voltage 907 varying with the magnitude of the input voltage input from the commercial AC power supply 100, the limit value on the switching current flowing to the FET 105 can be varied according to the input voltage.

[Switching Current under Current Limitation]

Figure 13:
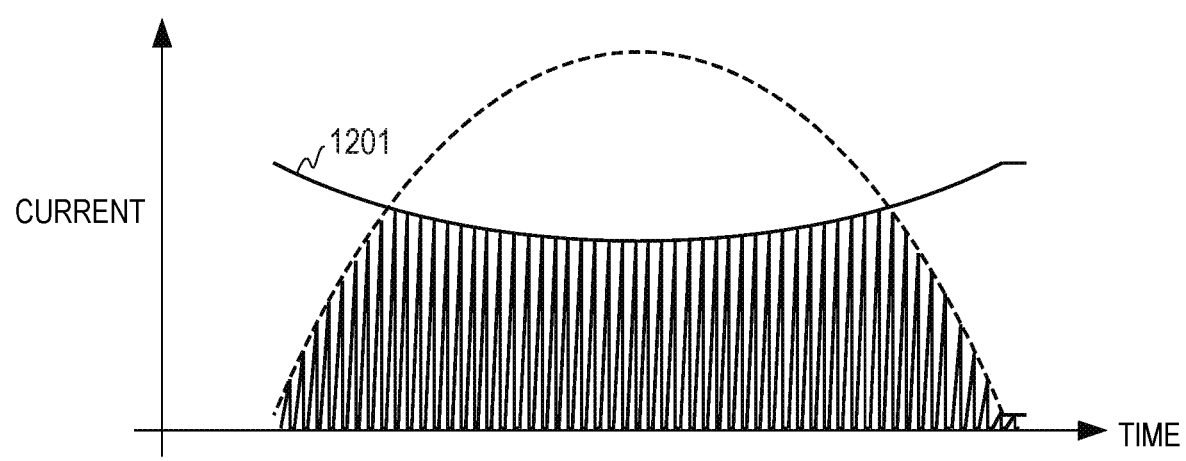
FIG. 13 is a diagram describing a switching current, under current limitation, of the power supply apparatus in the second embodiment.

FIG. 13 illustrates a switching current waveform in a half period, under light load, of the pulsating current resulting from rectifying the AC voltage from the commercial AC power supply 100 by the rectifier 101, in the case where the switching current limitation in this embodiment is performed. In FIG. 13, the horizontal axis represents time and the vertical axis represents the current value of the switching current. In FIG. 13, the current value 1201 indicates the maximum value of the switching current varying with the output terminal voltage 907. During the periods in which the current is not limited, i.e., in which the current value does not reach the current value 1201 under light load as indicated by dashed lines, the switching current waveform is similar to the current waveform in FIG. 5 of the first embodiment.

As illustrated in FIG. 13, the value of the switching current flowing to the FET 105 is kept below the maximum current value 1201 of the switching current varying with the output terminal voltage 907. The maximum current value 601 of the switching current in the first embodiment (see FIG. 7) is a predetermined fixed current value. In contrast, the maximum current value 1201 of the switching current in the second embodiment is controlled to be lower when the input voltage from the commercial AC power supply 100 is higher, and to be higher when the input voltage is lower.

As described above, as in the first embodiment, this embodiment can realize both the cost reduction resulting from improved power supply efficiency under light load and from the ability of inrush current prevention control, and accommodation of large-current output, in the power supply apparatus 32. The limit on the switching-current can be switched by changing the reference voltage 911 of the reference power supply 903. Further, in this embodiment, since the maximum current value 1201 of the switching current varies with the input voltage, an appropriate current limit can be set according to the input voltage from the commercial AC power supply 100. Therefore, while the loss in the FET 105 can be reduced by setting the current limit around the peak value of the pulsating voltage, the current limit can be raised when the pulsating voltage is low, thereby providing more energy to the load during periods in which the pulsating voltage is low. Thus, even if the current limit set by the maximum current value 1201 of the switching current is lower than the maximum current value 601 of the switching current in the first embodiment, the same output power as in the first embodiment can be supplied to the load, thereby further reducing the loss in the FET 105.

As described above, according to this embodiment, high power-supply efficiency can be realized even under light load, and large-current output can also be accommodated.

[Other Embodiments]

[Application to Power Supply Apparatus Having Smoothing Circuit]

Figure 14:
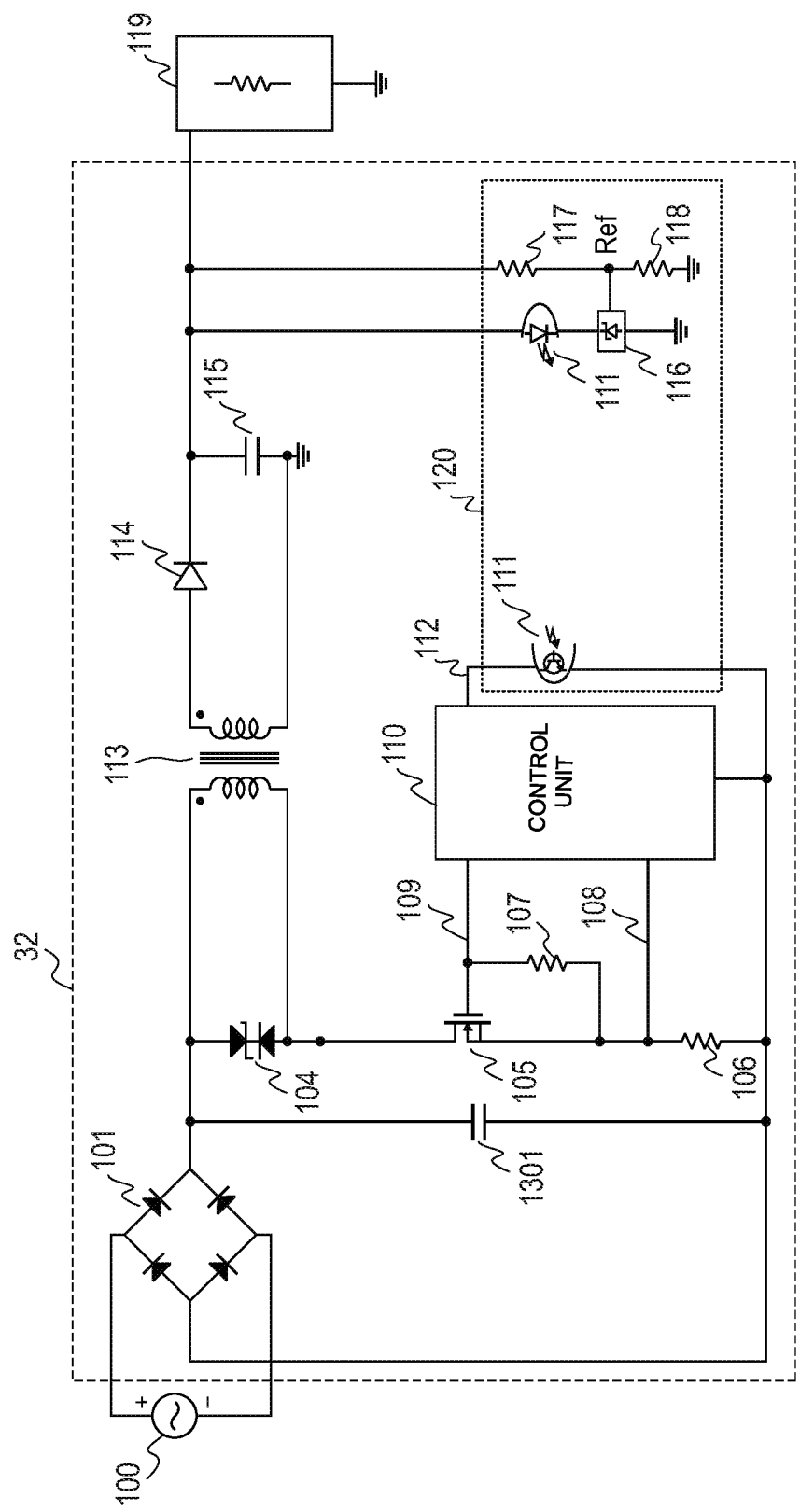
FIG. 14 is a schematic diagram illustrating a circuit configuration of a power supply apparatus in another embodiment.

The capacitor 102 in the power supply apparatus 32 described in the first and second embodiments is a small-capacitance ceramic capacitor for absorbing surges of the pulsating voltage generated by the rectifier 101. The power supply apparatus 32 has no large-capacitance capacitor for smoothing the pulsating voltage output from the rectifier 101. While the first and second embodiments have been described for the power supply apparatus without a smoothing capacitor on the primary side of the transformer 113 for smoothing the output voltage of the rectifier 101, the present invention can also be applied to a power supply apparatus with such a smoothing capacitor on the primary side. FIG. 14 is a schematic diagram illustrating a circuit configuration of the power supply apparatus 32 with a smoothing capacitor 1301, serving as a smoothing unit, on the primary side of the transformer 113. The circuit in FIG. 14 is distinct in that the small-capacitance ceramic capacitor 102 used in the circuit shown in FIG. 2 of the first embodiment for absorbing surges of the pulsating voltage is replaced with the large-capacitance electrolytic capacitor 1301. Other circuit components in FIG. 14 are similar to the circuit components in FIG. 2 of the first embodiment; like circuit components are given like numerals and will not be described here. In FIG. 14, the AC voltage input from the commercial AC power supply 100 is rectified by the rectifier 101 and smoothed by the electrolytic capacitor 1301. Based on the smoothed voltage, the FET 105 controls switching of the current to be supplied to the transformer 113. It is to be noted that the small-capacitance ceramic capacitor 102 in FIG. 9 of the second embodiment for absorbing surges of the pulsating voltage can also be replaced with the large-capacitance electrolytic capacitor 1301, as in FIG. 14.

Figure 15A:
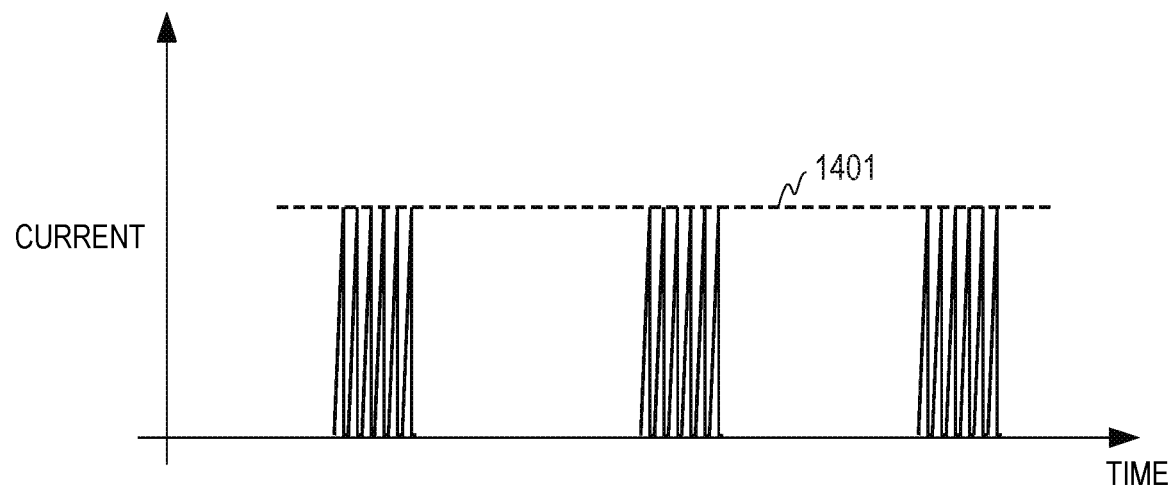
FIGS. 15A and 15B are diagrams describing switching currents, under light load, of the power supply apparatus in the other embodiment.
Figure 15B:
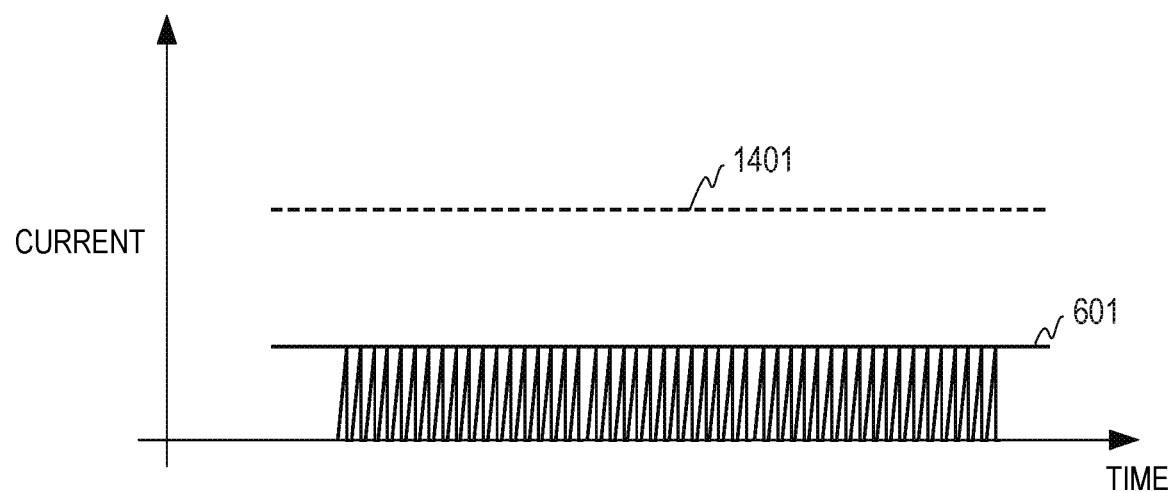

FIG. 15A is a diagram illustrating a waveform in a half period of a switching current flowing to the FET 105 from the commercial AC power supply 100 under light load. The horizontal axis represents time and the vertical axis represents the current value of the switching current flowing through the FET 105. A current value 1401 shown by a dashed line in FIG. 15A indicates the maximum current value of the switching current flowing to the FET 105. Under light load, the power supply apparatus 32 operates in burst mode according to the control unit 110 as in the first embodiment. Since the smoothed voltage is applied to the FET 105, the maximum current value 1401 of the switching current flowing to the FET 105 is approximately constant in a normal state. FIG. 15B is a diagram illustrating a waveform of the switching current in the case where the current value limit on the switching current flowing to the FET 105 is set by the current limit switching signal 208 as in the first embodiment. The horizontal axis represents time and the vertical axis represents the current value of the switching current of the FET 105. In FIG. 15B, the current value 1401 is the maximum value of the switching current flowing to the FET 105 in a normal state, and the current value 601 is the limited current value in the case where the current value limit is set. By limiting the current value of the switching current flowing to the FET 105 to the current value 601 or smaller, the loss in the FET 105 can be reduced to improve power supply efficiency under light load as in the first and second embodiments

[Application to Power Supply Apparatus Employing Voltage-Controlled PWM Control]

Figure 16:
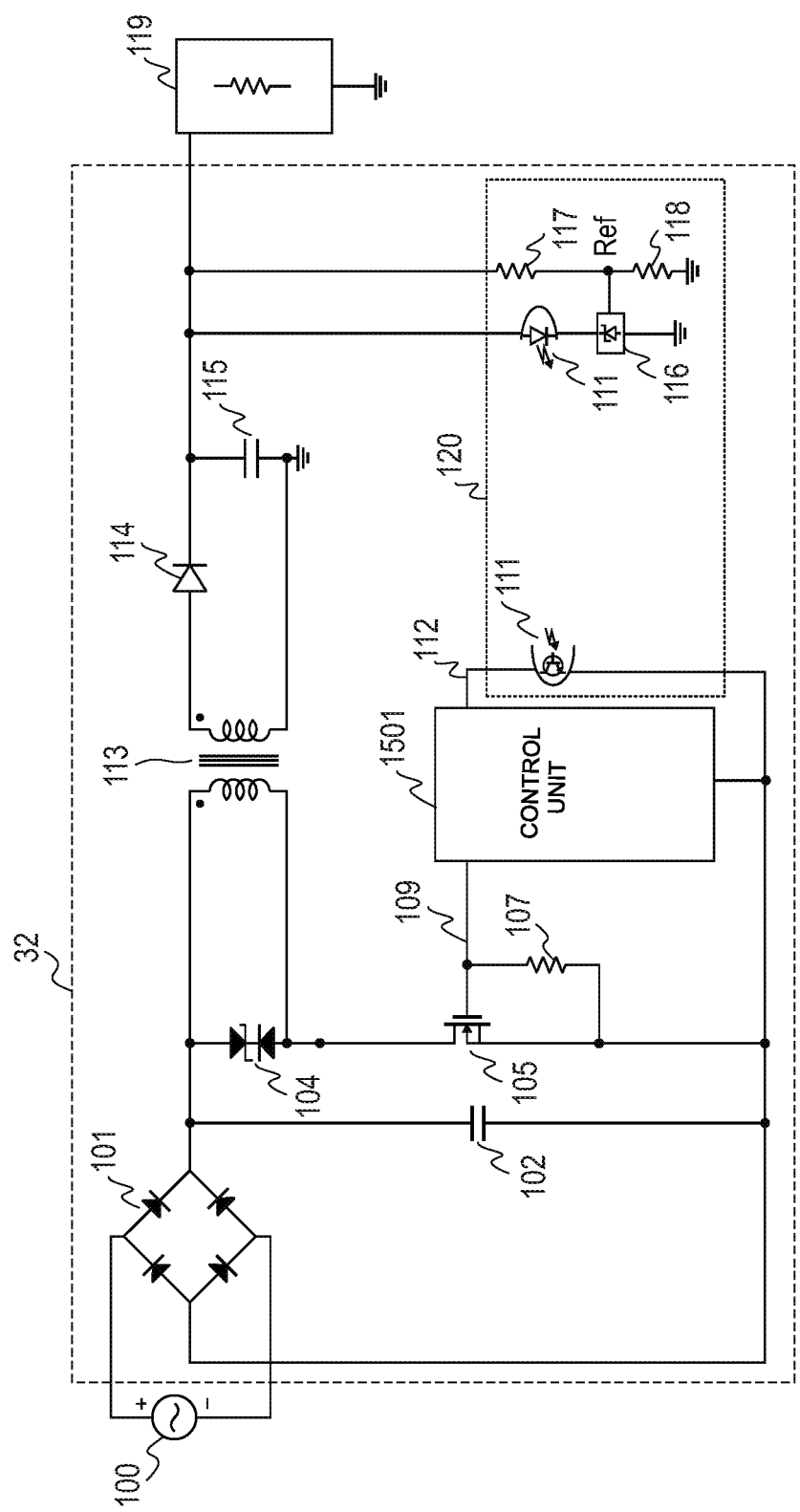
FIG. 16 is a schematic diagram illustrating a circuit configuration of a power supply apparatus in another embodiment.

In the first and second embodiments, the control unit 110 of the power supply apparatus 32 employs current-controlled fixed-frequency PWM control, in which switching of the FET 105 is controlled based on the switching current of the FET 105. The present invention can also be applied to other control schemes. As an exemplary control scheme that does not monitor the switching current of the FET 105, the following describes an example of employing voltage-controlled fixed-frequency PWM control. FIG. 16 is a schematic diagram illustrating a circuit configuration of a voltage-controlled power supply apparatus 32. The circuit configuration shown in FIG. 16 differs from the circuit configuration of the current-controlled power supply apparatus 32 in FIG. 2 of the first embodiment in that the detection resistor 106 for detecting the switching current is absent, and the control unit 110 is replaced with a control unit 1501. Since the detection resistor 106 is absent, the feedback signal 108 indicating the voltage across the detection resistor 106 is also removed in FIG. 16. Other circuit components in FIG. 16 are similar to the circuit components shown in FIG. 2 of the first embodiment; like circuit components are given like numerals and will not be described.

Figure 17:
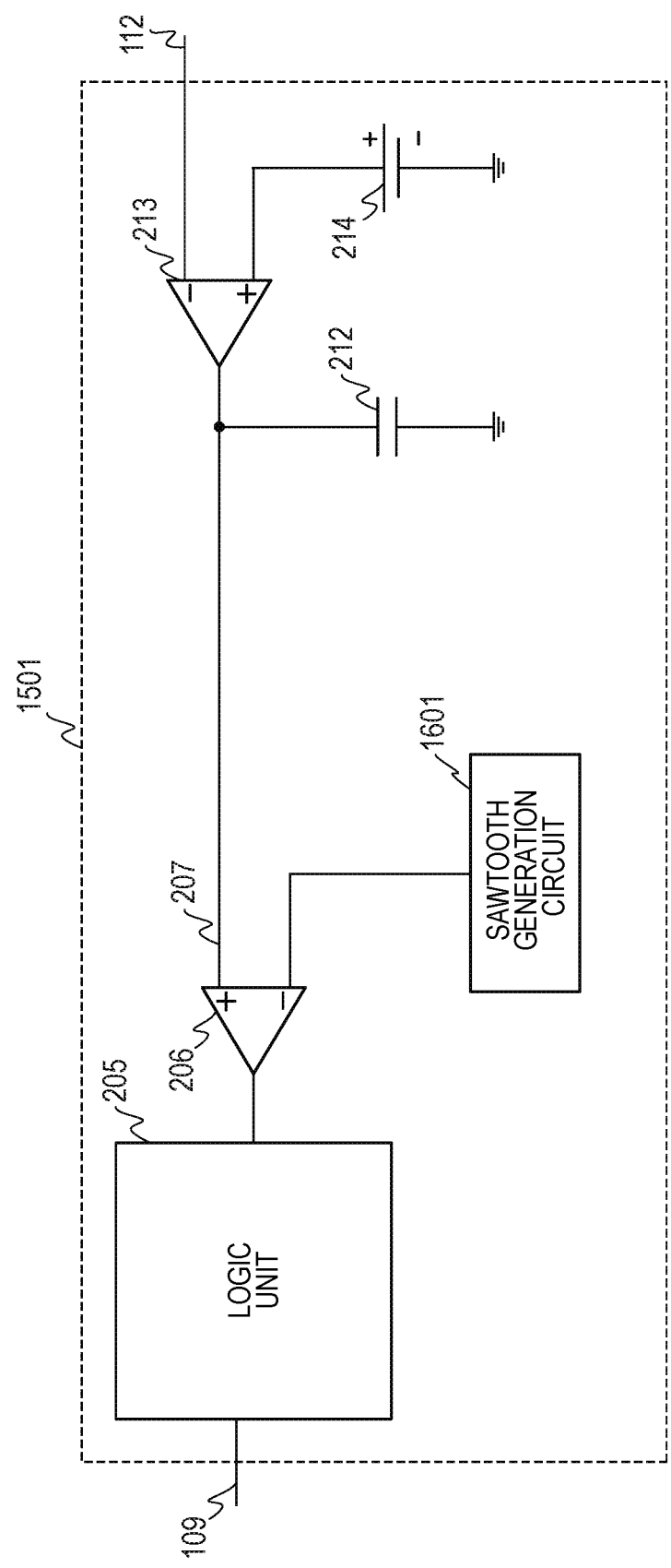
FIG. 17 is a diagram describing a configuration of a control unit in the other embodiment.
Figure 18:
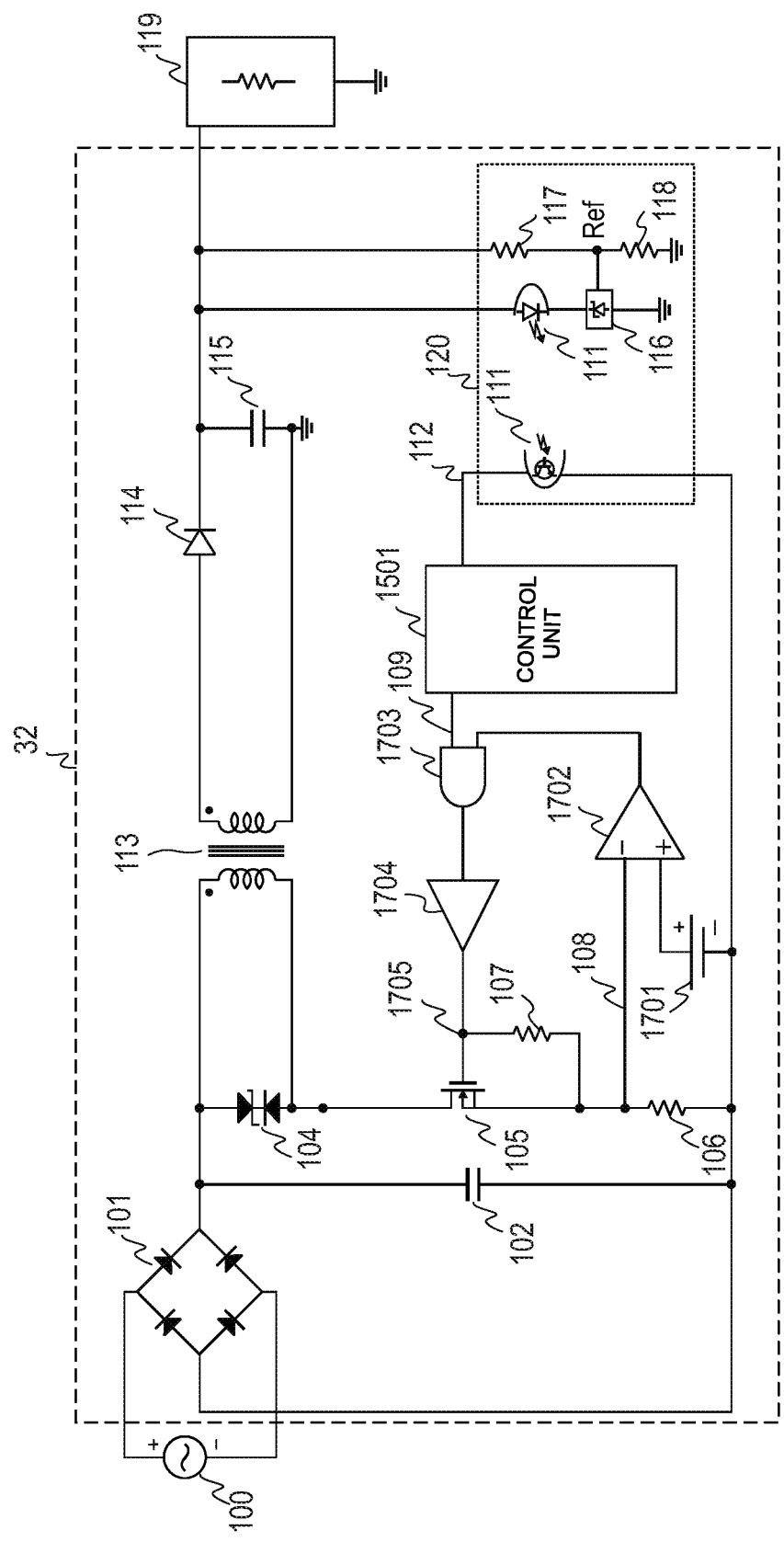
FIG. 18 is a schematic diagram illustrating a circuit configuration of a power supply apparatus in another embodiment.

FIG. 17 is a schematic circuit diagram illustrating a circuit configuration of the voltage-controlled control unit 1501 without a current limiting circuit. Compared with the circuit configuration of the control unit 110 shown in FIG. 3 of the first embodiment, the circuit configuration in FIG. 17 lacks the FET 210 and the Zener diode 209 that serve as the current limiting circuit, and the Zener diode 211 that limits the maximum voltage of the voltage-feedback voltage 207. Further, in the circuit shown in FIG. 17, an output signal from a sawtooth generation circuit 1601 is input to the inverting input terminal (−) of the comparator 206. The current-controlled control unit 110 shown in FIG. 3 of the first embodiment controls switching of the FET 105 based on the result of comparison by the comparator 206 between the voltage-feedback voltage 207 and the current-feedback voltage 204. In contrast, the voltage-controlled control unit 1501 controls switching of the FET 105 based on the result of comparison by the comparator 206 between the voltage-feedback voltage 207 and a fixed-frequency sawtooth waveform generated by the sawtooth generation circuit 1601. The switching frequency of the FET 105 is determined by the frequency of the sawtooth waveform generated by the sawtooth generation circuit 1601. Therefore, the logic unit 205 has no components such as an SR flip-flop and an oscillator but has components such as a drive circuit driven by the output signal of the comparator 206. Other circuit components of the control unit 1501 are similar to the circuit components shown in FIG. 3 of the first embodiment; like circuit components are given like numerals and will not be described here. For control of the FET 105, during the period in which the voltage-feedback voltage 207 is above the voltage of the sawtooth waveform generated by the sawtooth generation circuit 1601, the drive signal 109 output from the logic unit 205 rises (is at high level) to keep the FET 105 on. During the period in which the voltage-feedback voltage 207 is below the voltage of the sawtooth waveform, the drive signal 109 falls (is at low level) to keep the FET 105 off FIG. 18 is a schematic diagram illustrating a circuit configuration of a power supply apparatus 32 that has the above-described voltage-controlled control unit 1501 without a current limiting circuit, and that is provided with a current limiting circuit for limiting the current according to the switching current of the FET 105. Compared with the circuit shown in FIG. 16, the circuit in FIG. 18 additionally includes the detection resistor 106 for detecting the switching current of the FET 105, a comparator 1702, a reference power supply 1701, an AND circuit 1703, and a drive circuit 1704, which form a current limiting circuit. The inverting input terminal (−) of the comparator 1702 receives the feedback signal 108, which is a voltage signal resulting from detecting the switching current flowing through the FET 105 and converting the current by the detection resistor 106. The non-inverting input terminal (+) of the comparator 1702 receives a reference voltage from the reference power supply 1701. The output from the comparator 1702 is input to one of the input terminals of the AND circuit 1703, and the drive signal 109 output from the control unit 1501 is input to the other input terminal of the AND circuit 1703. The output from the AND circuit 1703 is input to the drive circuit 1704. The output from the drive circuit 1704 is input to the gate terminal of the FET 105 as a drive signal 1705 to control switching of the FET 105.

The comparator 1702 compares the voltage of the feedback signal 108 and the reference voltage of the reference power supply 1701. If the voltage of the feedback signal 108 is below the reference voltage, the comparator 1702 outputs a high-level signal. Then, the drive signal 109 output from the control unit 1501 is simply input to the drive circuit 1704 to control switching of the FET 105. If the voltage of the feedback signal 108 is above the reference voltage of the reference power supply 1701, the comparator 1702 outputs a low-level signal. Then, the AND circuit 1703 outputs a low-level signal to cause the drive circuit 1704 to output a low-level signal, and the FET 105 is forcibly turned off to limit the current. As a result, with the reference power supply 1701 and the detection resistor 106, the switching current flowing through the FET 105 can be limited to the maximum current value 601 or smaller as in the first embodiment. The maximum current value 601 of the switching current is, as in the first embodiment, assumed to be determined such that the input power to the transformer 113 does not fall below the output power required by the load 119. As described above, the same effects as in the first embodiment can be achieved even with a power supply apparatus having a voltage-controlled control unit. Although the above embodiments have all been described for the control units that control a PWM signal, the present invention can similarly be applied to control units that control a Pulse Frequency Modulation (PFM) control signal.

As described above, according to the other embodiments, high power-supply efficiency can be realized even under light load, and large-current output can also be accommodated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-003785, filed Jan. 12, 2018, which is hereby incorporated by reference herein in its entirety.

What is claimed is:

1. A power supply apparatus comprising:
a rectification unit configured to rectify an AC voltage from an AC power supply to generate an input voltage;
a transformer having a primary winding and a secondary winding;
a first switching element connected to the primary winding of the transformer to which the input voltage is applied;
a feedback unit configured to output a first feedback voltage according to an output voltage, the output voltage being induced in the secondary winding of the transformer and output to a load;
a current detection unit configured to detect a current flowing to the first switching element and output a second feedback voltage according to the current detected;
an output unit configured to output a driving signal for the first switching element based on the first feedback voltage and on the second feedback voltage;
a control unit configured to control an operation of the first switching element according to the driving signal output from the output unit; and
a limiting unit configured to, in a case where the output voltage is a first voltage, supply the first feedback voltage to the output unit, and in a case where the output voltage is a second voltage less than the first voltage, limit the first feedback voltage so as not to exceed a predetermined voltage and supply the limited first feedback voltage to the output unit.

2. The power supply apparatus according to claim 1, wherein the limiting unit has a second switching element configured to be turned on or off according to a state of the load, and a first voltage limiting element connected in series with the second switching element and configured to limit the first feedback voltage to prevent the first feedback voltage output from the feedback unit from exceeding the predetermined voltage in a case where a current of the predetermined current value flows to the second switching element, and
wherein the first voltage limiting element is configured to, is a case where the second switching element is in a turn-on state, correct the first feedback voltage to prevent the current flowing to the second switching element from exceeding the predetermined current value.

3. The power supply apparatus according to claim 2, wherein the limiting unit further includes another second switching element or other second switching elements and another first voltage limiting element or other first voltage limiting elements connected in series with the second switching elements,
wherein each of the second switching elements are turned on or off according to a different state of the load, and
wherein each of the first voltage limiting element limiting elements limit the first feedback voltage to below a different voltage value.

4. The power supply apparatus according to claim 2, wherein the second switching element is turned on in a case where the load is in a light-load state in which the output voltage is the second voltage, and turned off in a case where the load is in a heavy-load state in which the output voltage is the first voltage.

5. The power supply apparatus according to claim 2, wherein the second switching element is turned on upon power-on of the power supply apparatus.

6. The power supply apparatus according to claim 2, wherein the output unit has a second voltage limiting element configured to correct the first feedback voltage for limiting a value of the current flowing to the second switching elements, and
wherein the value of the current flowing to the second switching element corresponding to the first feedback voltage and limited by the second voltage limiting element is larger than the predetermined current value.

7. The power supply apparatus according to claim 1, comprising a voltage detection unit having resistors and configured to output a third feedback voltage resulting from dividing the input voltage by the resistors,
wherein the output unit has an inverting amplifier to which a reference voltage output from a reference power supply and the third feedback voltage output from the voltage detection unit are input,
wherein the inverting amplifier outputs an inverted voltage resulting from amplifying and inverting a polarity of the third feedback voltage with reference to the reference voltage, and
the output unit outputs a driving signal for the first switching element based on the inverted voltage output from the inverting amplifier, the first feedback voltage, and the second feedback voltage.

8. The power supply apparatus according to claim 7, wherein the higher the input voltage is, the lower the inverted voltage output from the inverting amplifier is, and the lower the input voltage is, the higher the inverted voltage output from the inverting amplifier is.

9. The power supply apparatus according to claim 7, wherein the reference voltage of the reference power supply is set according to a limited current value for the current flowing to the first switching element.

10. The power supply apparatus according to claim 7, wherein the output unit has a second voltage limiting element configured to correct the first feedback voltage for limiting a value of the current flowing to the first switching element, and
wherein the value of the current flowing to the first switching element corresponding to the first feedback voltage and limited by the second voltage limiting element is larger than the value of the current flowing to the first switching element and limited by the inverted voltage.

11. The power supply apparatus according to claim 1, comprising a smoothing unit configured to smooth the input voltage generated by the rectification unit.

12. An image forming apparatus comprising:
an image forming unit configured to form an image on a recording material; and
a power supply apparatus configured to generate power for forming the image,
wherein the power supply apparatus comprises:
a rectification unit configured to rectify an AC voltage from an AC power supply to generate an input voltage;
a transformer having a primary winding and a secondary winding;
a first switching element connected to the primary winding of the transformer to which the input voltage is applied;
a feedback unit configured to output a first feedback voltage according to an output voltage, the output voltage being induced in the secondary winding of the transformer and output to a load;
a current detection unit configured to detect a current flowing to the first switching element and output a second feedback voltage according to the current detected;
an output unit configured to output a driving signal for the first switching element based on the first feedback voltage and on the second feedback voltage;
a control unit configured to control an operation of the first switching element according to the driving signal output from the output unit; and
a limiting unit configured to, in a case where the output voltage is a first voltage, supply the first feedback voltage to the output unit, and in a case where the output voltage is a second voltage less than the first voltage, limit the first feedback voltage so as not to exceed a predetermined voltage and supply the limited first feedback voltage to the output unit.

13. The image forming apparatus according to claim 12, comprising a controller configured to control the image forming unit,
wherein the controller turns off the first switching element in a heavy-load state in which the output voltage is the first voltage and image forming is performed, and turns on the first switching element in a light-load state in which the output voltage is the second voltage and image forming is not performed.

* * * * *